United States Patent
Nakagawa

(10) Patent No.: US 10,589,494 B2
(45) Date of Patent: Mar. 17, 2020

(54) FAR INFRARED REFLECTIVE FILM, DISPERSION FOR FORMING FAR INFRARED REFLECTIVE FILM, MANUFACTURING METHOD OF FAR INFRARED REFLECTIVE FILM, FAR INFRARED REFLECTIVE GLASS, AND WINDOW

(71) Applicant: FUJIFILM Corporation, Tokyo (JP)

(72) Inventor: Yuki Nakagawa, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 238 days.

(21) Appl. No.: 15/655,144

(22) Filed: Jul. 20, 2017

(65) Prior Publication Data

US 2017/0320302 A1 Nov. 9, 2017

Related U.S. Application Data

(63) Continuation of application No. PCT/JP2016/057885, filed on Mar. 14, 2016.

(30) Foreign Application Priority Data

Mar. 25, 2015 (JP) ................. 2015-062099

(51) Int. Cl.
*G02B 5/08* (2006.01)
*B32B 27/18* (2006.01)
(Continued)

(52) U.S. Cl.
CPC ........ *B32B 27/18* (2013.01); *B32B 17/10036* (2013.01); *B32B 17/10449* (2013.01);
(Continued)

(58) Field of Classification Search
CPC . G02B 5/208; G02B 5/26; G02B 1/08; G02B 1/10; G02B 5/00; G02B 5/08;
(Continued)

(56) References Cited

U.S. PATENT DOCUMENTS

2009/0148711 A1 6/2009 Le Blanc et al.
2009/0226753 A1 9/2009 Naoi
(Continued)

FOREIGN PATENT DOCUMENTS

CN 101184866 A 5/2008
CN 104205247 A 12/2014
(Continued)

OTHER PUBLICATIONS

International Search Report, issued in PCT/JP2016/057885 (PCT/ISA/210), dated Jun. 14, 2016.
(Continued)

*Primary Examiner* — Arnel C Lavarias
(74) *Attorney, Agent, or Firm* — Birch, Stewart, Kolasch & Birch, LLP

(57) ABSTRACT

Provided are a far infrared reflective film including a support, and a fibrous silver particles-containing layer provided on the support, in which the fibrous silver particles-containing layer includes fibrous silver particles, and a sol-gel hardened material obtained by hydrolysis and polycondensation of a metal coupling agent including a functional group capable of interacting with the fibrous silver particles, and an alkoxide compound, which has excellent heat insulating properties, film hardness, and surface properties; a dispersion for forming a far infrared reflective film; a manufacturing method of a far infrared reflective film; a far infrared reflective glass; and a window.

13 Claims, 2 Drawing Sheets

(51) Int. Cl.
  *G02B 5/26* (2006.01)
  *C03C 17/32* (2006.01)
  *B32B 17/10* (2006.01)
  *G02B 5/20* (2006.01)

(52) U.S. Cl.
  CPC ........ *B32B 17/10761* (2013.01); *C03C 17/32* (2013.01); *G02B 5/208* (2013.01); *G02B 5/26* (2013.01)

(58) Field of Classification Search
  CPC .......... G02B 5/0808; G02B 5/20; G02B 5/30; G02B 5/3008; B32B 27/18; B32B 17/10036; B32B 17/10449; B32B 17/10761; B32B 17/10376; B32B 17/10403; C03C 17/32
  USPC ....... 359/359, 350, 355, 356, 357, 360, 352, 359/485.05, 487.03, 838, 839, 883
  See application file for complete search history.

(56) References Cited

U.S. PATENT DOCUMENTS

| | | | |
|---|---|---|---|
| 2009/0242231 A1 | 10/2009 | Miyagisima et al. | |
| 2009/0311530 A1 | 12/2009 | Hirai et al. | |
| 2010/0078197 A1 | 4/2010 | Miyagishima et al. | |
| 2010/0078602 A1 | 4/2010 | Hosoya et al. | |
| 2014/0048131 A1 | 2/2014 | Tanaka et al. | |
| 2014/0069488 A1 | 3/2014 | Tanaka et al. | |
| 2014/0299359 A1* | 10/2014 | Mittal | H01L 31/022466 174/251 |
| 2015/0004327 A1 | 1/2015 | Yamamoto et al. | |
| 2017/0052296 A1* | 2/2017 | Kiyoto | B32B 27/18 |
| 2017/0136740 A1* | 5/2017 | Kiyoto | B32B 17/10 |
| 2017/0145737 A1* | 5/2017 | Hasegawa | B32B 27/18 |
| 2018/0079917 A1* | 3/2018 | Kiyoto | C09D 133/20 |

FOREIGN PATENT DOCUMENTS

| | | |
|---|---|---|
| JP | 2009-215594 A | 9/2009 |
| JP | 2009-242880 A | 10/2009 |
| JP | 2009-299162 A | 12/2009 |
| JP | 2010-84173 A | 4/2010 |
| JP | 2010-86714 A | 4/2010 |
| JP | 2012-238579 A | 12/2012 |
| JP | 2012-252172 A | 12/2012 |
| JP | 2013-225460 A | 10/2013 |
| JP | 2013-225461 A | 10/2013 |

OTHER PUBLICATIONS

Written Opinion of the International Searching Authority, issued in PCT/JP2016/057885 (PCT/ISA/237), dated Jun. 14, 2016.
International Preliminary Report on Patentability and English translation of Written Opinion of the International Searching Authority, dated Sep. 26, 2017, issued in PCT/JP2016/057885 (Forms PCT/IB/373 and PCT/ISA/237).
Chinese Office Action and Search Report, dated Jan. 17, 2019, for Chinese Application No. 201680006312.0, with an English translation.
Chinese Office Action for Chinese Application No. 201680006312.0, dated Jul. 22, 2019, with English translation.

* cited by examiner

FAR INFRARED REFLECTIVE FILM, DISPERSION FOR FORMING FAR INFRARED REFLECTIVE FILM, MANUFACTURING METHOD OF FAR INFRARED REFLECTIVE FILM, FAR INFRARED REFLECTIVE GLASS, AND WINDOW

CROSS-REFERENCE TO RELATED APPLICATIONS

This application is a Continuation of PCT International Application No. PCT/JP2016/057885, filed on Mar. 14, 2016, which claims priority under 35 U.S.C. Section 119(a) to Japanese Patent Application No. 2015-062099 filed on Mar. 25, 2015. Each of the above applications is hereby expressly incorporated by reference, in its entirety, into the present application.

BACKGROUND OF THE INVENTION

1. Field of the Invention

The present invention relates to a far infrared reflective film, a dispersion for forming a far infrared reflective film, a manufacturing method of a far infrared reflective film, a far infrared reflective glass, and a window. More specifically, the invention relates to a far infrared reflective film having excellent heat insulating properties, film hardness, and surface properties, a manufacturing method of this far infrared reflective film, a far infrared reflective glass using this far infrared reflective film, a window using this far infrared reflective film, and a dispersion for forming a far infrared reflective film which can provide a far infrared reflective film having excellent heat insulating properties, film hardness, and surface properties and has excellent stability of the dispersion.

2. Description of the Related Art

In recent years, products with a lower environmental burden, which are so-called eco-friendly products have been required as one of energy saving measures for carbon dioxide reduction, and solar control window films for windows of vehicles or buildings have been required. A far infrared reflective film is considered as such a product. The far infrared reflective film is a film which reflects far infrared rays emitted from an indoor side to an outdoor side and delays transmission and reception of heat between an indoor side and an outdoor side by being attached to windows, usage of heating and cooling is reduced by using this film, and therefore, energy saving can be expected. A degree of heat insulation is defined by using a coefficient of overall heat transmission. In the solar control window film procurement standard in the "Law Concerning the Promotion of Procurement of Eco-Friendly Goods and Services by the State and Other Entities (so-called Green Purchasing Law)", heat insulating properties are to be obtained in a case where a coefficient of overall heat transmission is less than 5.9 W/(m²·K) measured by using a measurement method based on Japanese Industrial Standards (JIS) A 5759 "Films for window glasses of buildings". In a case where the numerical value thereof is small, the transmission of heat is delayed and heat insulating properties are increased. According to JIS A 5759, a coefficient of overall heat transmission can be acquired from reflection spectra of far infrared rays at a wavelength of 5 μm to 50 μm. That is, it is preferable to increase reflectivity of far infrared rays at a wavelength of 5 μm to 50 μm, order to decrease a coefficient of overall heat transmission.

Fibrous silver particles are known as a material of a heat ray shielding film exhibiting heat insulating properties. JP2012-252172A, for example, discloses a heat ray shielding film including a transparent film and a heat ray reflecting layer provided on the surface thereof, in which the heat ray reflecting layer includes metal nanofibers. In the examples of JP2012-252172A, a first heat ray reflecting layer in which a conductive polymer is selected as a material of a binder, and a second heat ray reflecting layer in which metal nanofibers are dispersed by using polyvinyl alcohol as a binder are laminated on each other, from a viewpoint of exhibiting heat insulating properties. According to JP2012-252172A, the heat ray reflecting layer of the heat ray shielding film includes the metal nanofibers, and thus, excellent heat insulating properties are obtained in that heat rays of a heater or the like radiated from the indoor side are reflected to prevent radiation and outdoor heat does not enter the indoor side.

It is known that the fibrous silver particles are used as a material of a conductive member.

JP2013-225460A, for example, discloses a conductive member including a base material, and a conductive layer provided on the base material, in which the conductive layer includes (i) metal nanowires having an average short axis length equal to or smaller than 150 nm and (ii) a binder, and the binder includes a three-dimensional crosslinking structure including a partial structure represented by General Formula (Ia) and a partial structure represented by General Formula (IIa) or General Formula (IIb).

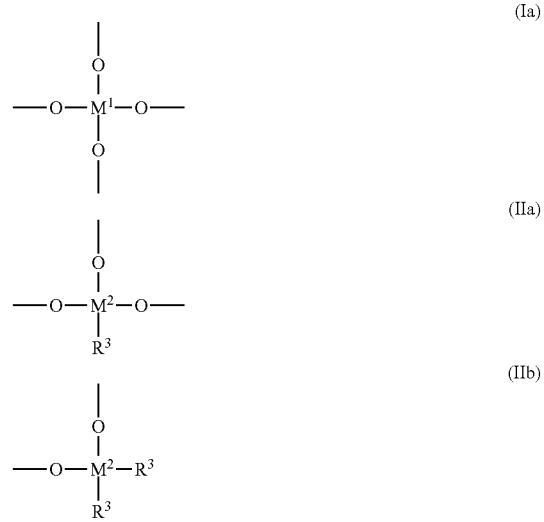

(In the formulae, $M^1$ and $M^2$ each independently represent an element selected from the group consisting of Si, Ti, and Zr, and $R^3$'s each independently represent a hydrogen atom or a hydrocarbon group)

In addition, JP2012-238579A discloses a conductive member: including a conductive layer configured to include conductive fibers having a short axis diameter equal to or smaller than 150 nm and include a three-dimensional crosslinking bond including a bond represented by General Formula (I), on a base material; and at least one interlayer between the base material and the conductive layer.

 (I)

(In General Formula (I), $M^1$ represents an element selected from the group consisting of Si, Ti, Zr, and Al.)

SUMMARY OF THE INVENTION

When the inventor investigated performance of the heat ray shielding film disclosed in JP2012-252172A, in order to use the heat ray shielding film as a far infrared reflective film, it was found that physical strength necessary for a far infrared reflective film was insufficient and film hardness was insufficient.

When the inventor investigated performance of the conductive members disclosed in JP2013-225460A and JP2012-238579A, in order to use the conductive members as far infrared reflective films for different purposes, it was found that a sufficient heat insulating effect was not obtained with the conductive members disclosed in JP2013-225460A and JP2012-238579A.

When the inventor increased the content of fibrous silver particles to some extent so that heat insulating performance is sufficiently obtained, from a viewpoint of improving conductive members disclosed in JP2013-225460A and JP2012-238579A, it was found that stability of a dispersion (sol-gel coating solution) including fibrous silver particles and an alkoxide compound is decreased to cause an increase in viscosity, and a coating film having excellent surface properties is not obtained.

An object of the invention is to provide a far infrared reflective film having excellent heat insulating properties, film hardness, and surface properties.

As a result of intensive studies of the inventor, it was found that the above-mentioned problems could be solved by a method of selecting a metal coupling agent including a functional group capable of interacting with fibrous silver particles, among compounds having a functional group capable of interacting with fibrous silver particles added to an interlayer which is a layer separated from a conductive layer including fibrous silver particles, in order to improve film hardness, abrasion resistance, and bending resistance, in JP2013-225460A and JP2012-238579A, and mixing the metal coupling agent with a fibrous silver particle aqueous dispersion in advance, and performing hydrolysis and polycondensation of the mixture and an alkoxide compound.

The invention and preferable aspects of the invention which are specific means for solving the above-mentioned problems are as follows.

[1] A far infrared reflective film comprising:
a support; and
a fibrous silver particles-containing layer provided on the support,
in which the fibrous silver particles-containing layer includes fibrous silver particles, and a sol-gel hardened material obtained by hydrolysis and polycondensation of a metal coupling agent including a functional group capable of interacting with the fibrous silver particles, and an alkoxide compound.

[2] In the far infrared reflective film according to [1], it is preferable that the functional group capable of interacting with the fibrous silver particles is selected from the group consisting of an amide group, an amino group, a mercapto group, a phosphoric acid group, a phosphonic acid group, an isocyanate group, a carboxylic acid group, a sulfonic acid group, and a salt of these groups.

[3] In the far infrared reflective film according to [1] or [2], it is preferable that the functional group capable of interacting with the fibrous silver particles is selected from an amino group, a mercapto group, and an isocyanate group.

[4] In the far infrared reflective film according to any one of [1] to [3], it is preferable that the metal coupling agent including the functional group capable of interacting with the fibrous silver particles satisfies the number of atom linking chains between the functional group capable of interacting with the fibrous silver particles and a central metal element of the metal coupling agent which is 3 to 6.

[5] In the far infrared reflective film according to any one of [1] to [4], it is preferable that the metal coupling agent and the alkoxide compound are each independently a metal coupling agent and an alkoxide compound including an element selected from the group consisting of Si, Ti, Zr, and Al.

[6] In the far infrared reflective film according to any one of [1] to [5], it is preferable that the metal coupling agent and the alkoxide compound are respectively a metal coupling agent and an alkoxide compound including a Si element.

[7] In the far infrared reflective film according to any one of [1] to [6], it is preferable that a mass ratio of a content of the metal coupling agent including the functional group capable of interacting with the fibrous silver particles with respect to a content of the fibrous silver particles constituting the fibrous silver particles-containing layer is 0.0005/1 to 0.05/1.

[8] In the far infrared reflective film according to any one of [1] to [7], it is preferable that a content per unit area of the fibrous silver particles constituting the fibrous silver particles-containing layer is 0.036 to 0.150 g/m².

[9] In the far infrared reflective film according to any one of [1] to [8], it is preferable that an average long axis length of the fibrous silver particles is 5 to 30 μm.

[10] In the far infrared reflective film according to any one of [1] to [9], it is preferable that the far infrared reflective film further comprises an interlayer including a compound including a functional group capable of interacting with the fibrous silver particles, between the support and the fibrous silver particles-containing layer, and the interlayer including the compound including the functional group capable of interacting with the fibrous silver particles is directly in contact with the fibrous silver particles-containing layer.

[11] In the far infrared reflective film according to any one of [1] to [10], it is preferable that the fibrous silver particles-containing layer is disposed on the outermost layer on an indoor side.

[12] A dispersion for forming a far infrared reflective film, comprising: fibrous silver particles; a metal coupling agent including a functional group capable of interacting with the fibrous silver particles; and an alkoxide compound.

[13] A manufacturing method of a far infrared reflective film, comprising:
applying a dispersion for forming a far infrared reflective film, including fibrous silver particles, a metal coupling agent including a functional group capable of interacting with the fibrous silver particles, and an alkoxide compound, onto a support; and
performing hydrolysis and polycondensation of the metal coupling agent and the alkoxide compound to obtain a sol-gel hardened material.

[14] A far infrared reflective glass obtained by laminating the far infrared reflective film according to any one of [1] to [11] and a glass.

[15] A window comprising: a transparent window support; and the far infrared reflective film according to any one of [1] to [11] bonded to the transparent window support.

According to the invention, it is possible to provide a far infrared reflective film having excellent heat insulating properties, film hardness, and surface properties.

According to the invention, it is possible to provide a dispersion for forming a far infrared reflective film of the invention which can provide a far infrared reflective film having excellent heat insulating properties, film hardness, and surface properties and has excellent stability of the dispersion.

DESCRIPTION OF THE PREFERRED EMBODIMENTS

Figure 1:
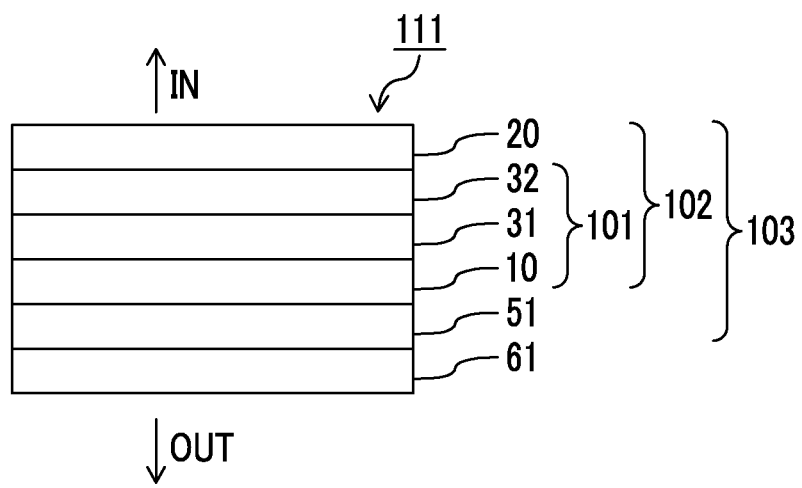
FIG. 1 is a schematic view showing a cross section of an example of a far infrared reflective glass of the invention.

Hereinafter, the invention will be described in detail. The description of the following constituent elements is based on representative embodiments and specific examples, but the invention is not limited to such embodiments. In this specification, a number range expressed using "to" means a range including the numerical numbers before and after the term "to" as a lower limit value and an upper limit value.

[Far Infrared Reflective Film]

A far infrared reflective film of the invention is a far infrared reflective film including: a support; and a fibrous silver particles-containing layer provided on the support, in which the fibrous silver particles-containing layer includes fibrous silver particles, and a sol-gel hardened material obtained by hydrolysis and polycondensation of a metal coupling agent including a functional group capable of interacting with the fibrous silver particles, and an alkoxide compound.

With such a configuration, it is possible to provide a far infrared reflective film having excellent heat insulating properties, film hardness, and surface properties. A mechanism of providing a far infrared reflective film having excellent heat insulating properties, film hardness, and surface properties with such a configuration is not based on a certain theory but is assumed as follows.

In order to increase a degree of far infrared reflection to increase heat insulating properties, it is necessary to increase a content of the fibrous silver particles. In order to increase film hardness, it is necessary to increase a content of the sol-gel hardened material.

Meanwhile, the fibrous silver particles are originally easily combined with each other. In a case where the content of the sol-gel hardened material is increased, condensation easily proceeds. Accordingly, stability of a dispersion (sol-gel coating solution) including the fibrous silver particles, the metal coupling agent, and the alkoxide compound is easily decreased to cause an increase in viscosity, and in this case, a coating film having excellent surface properties is not obtained.

In the invention, the functional group capable of interacting with the fibrous silver particles, included in the "metal coupling agent including the functional group capable of interacting with the fibrous silver particles" can be aggregated in the vicinity of the fibrous silver particles so as to cover the fibrous silver particles and can disperse the fibrous silver particles so that the fibrous silver particles are not combined with each other. In addition, it is assumed that a —OH group formed by hydrolysis of the "metal coupling agent including the functional group capable of interacting with the fibrous silver particles" forms a hydrogen bond with a —OH group formed by hydrolysis of the alkoxide compound, and accordingly, dispersed fibrous silver particles are stabilized.

In the invention, the metal coupling agent including the functional group capable of interacting with the fibrous silver particles is introduced as the dispersing agent, and accordingly, even in a case where the contents of the fibrous silver particles and the metal coupling agent are respectively increased in order to increase heat insulating properties and film hardness, an increase in viscosity or aggregation of the coating solution hardly occurs, and a dramatic effect of significantly improving stability of the coating solution is obtained. Therefore, a far infrared reflective film having excellent heat insulating properties, film hardness, and surface properties is obtained. Even in a case where the additive amount of the metal coupling agent including the functional group capable of interacting with the fibrous silver particles is small, a far infrared reflective film having excellent heat insulating properties, film hardness, and surface properties is obtained.

In the related art, in order to increase stability of a solution including hydrolysis solution of the alkoxide compound, a method of selecting an alkoxide compound having the small number of alkoxide functional groups or a metal coupling agent has been known, in order to decrease a condensation rate, but this was not a preferable method, because, in a case of applying the alkoxide compound or the metal coupling agent to the far infrared reflective film, the amount of organic compound components was increased to increase the absorption amount of far infrared rays.

In JP2012-238579A, an alkoxide compound including a functional group capable of interacting with fibrous silver particles is introduced to an interlayer, but in the invention, the metal coupling agent including the functional group capable of interacting with fibrous silver particles is used in the fibrous silver particles-containing layer, and therefore, a far infrared reflective film having excellent heat insulating properties, film hardness, and surface properties is obtained.

Hereinafter, a preferable aspect of the far infrared reflective film of the invention will be described.

<Characteristics>

(Resistivity of Fibrous Silver Particles-Containing Layer)

In the far infrared reflective film of the invention, a resistivity of the fibrous silver particles-containing layer described above is preferably greater than 1,000Ω/□ (Ω per square). The resistivity of the fibrous silver particles-containing layer is more preferably equal to or greater than 1,500Ω/□, particularly preferably equal to or greater than 2,000Ω/□, and more particularly preferably equal to or greater than 3,000Ω/□. In the far infrared reflective film, it is preferable that the resistivity of the fibrous silver particles-containing layer is high, from a viewpoint of excellent radio-wave transmittance.

(Other Characteristics)

The far infrared reflective film of the invention has excellent heat insulating properties and a low coefficient of overall heat transmission. A preferable range of the coefficient of overall heat transmission is the same as a range described as an evaluation standard in the examples which will be described later.

<Configuration>

A configuration of the far infrared reflective film of the invention will be described.

FIG. 1 shows a schematic view showing a cross section of an example of a far infrared reflective glass of the invention including the far infrared reflective film of the invention. A far infrared reflective glass 111 of the invention includes a far infrared reflective film 103 of the invention and a glass 61. The far infrared reflective film 103 of the invention is preferably disposed on the inner side of the window (indoor side, side opposite to a sunlight incident side during daytime, IN side in FIG. 1), in a case where the glass 61 is a part of the window (window glass). In a case where the fibrous silver particles-containing layer is disposed on a surface of the support on a side opposite to a surface of a window side (preferably, the fibrous silver particles-containing layer is used as the outermost layer on the indoor side, as possible), far infrared rays are easily reflected. In a case where the far infrared reflective film is not provided, far infrared rays in a room are absorbed onto glass and the indoor heat escapes to the outside of the room due to thermal conduction to the glass, but in a case where the far infrared reflective film is provided, far infrared rays are reflected in the room, and accordingly, the indoor heat hardly escapes to the outside of the room.

The far infrared reflective film 103 of the invention at least includes a support 10 and a fibrous silver particles-containing layer 20 disposed on the support 10.

The fibrous silver particles-containing layer 20 is preferably disposed on a surface of the support 10 on a side opposite to a surface on the window (glass 61) side. In the invention, it is preferable that the fibrous silver particles-containing layer 20 is to be disposed or is disposed on the outermost layer or the second outermost layer on the indoor side, in a viewpoint of increasing heat insulating properties, and it is more preferable that the fibrous silver particles-containing layer is to be disposed or is disposed on the outermost layer on the indoor side.

A laminate obtained by bonding the support and the fibrous silver particles-containing layer 20 provided on the support through an adhesive layer may be referred to as a heat insulating member 102. The adhesive layer may be a single layer or may be a laminate of two or more layers, and the adhesive layer in FIG. 1 is a laminate of the first adhesive layer 31 and the second adhesive layer 32. In addition, a laminate obtained by providing the adhesive layer (laminate of the first adhesive layer 31 and the second adhesive layer 32 in FIG. 1) on the support 10 may be referred to as an adhesive layer-attached support 101.

In the far infrared reflective film 103 of the invention, it is preferable that the pressure sensitive adhesive layer 51 is provided on a surface of the support 10 on the window (glass 61) side and it is preferable that the glass 61 and the pressure sensitive adhesive layer 51 are bonded to each other. The far infrared reflective film of the invention is preferably used for a window.

Hereinafter, preferred aspects of each layer configuring the far infrared reflective film of the invention will be described.

<Support>

Various elements can be used as the support described above according to the purpose, as long as it shoulders the fibrous silver particles-containing layer. Generally, a plate-shaped or a sheet-shaped material is used.

The support may be transparent or may be opaque. Examples of a material configuring the support include transparent glass such as white plate glass, blue plate glass, or silica-coated blue plate glass; a synthetic resin such as polycarbonate, polyether sulfone, polyester, an acrylic resin, a vinyl chloride resin, an aromatic polyamide resin, polyamide imide, or polyimide; metal such as aluminum, copper, nickel, or stainless steel; ceramic; and a silicon wafer used in a semiconductor substrate. The surface of the support where the fibrous silver particles-containing layer is formed may be previously treated by purification treatment using an alkaline aqueous solution, chemical treatment using a silane coupling agent, plasma treatment, ion plating, sputtering, a gas phase reaction method, and vacuum evaporation, if desired.

A thickness of the support is in a desired range according to the purpose. In general, the thickness thereof is selected from a range of 1 µm to 500 µm, is more preferably 3 µm to 400 µm, and even more preferably 5 µm to 300 µm.

Visible light transmittance of the support is preferably equal to or greater than 70%, more preferably equal to or greater than 85%, and even more preferably equal to or greater than 90%. The visible light transmittance of the support is measured based on ISO (International Organization for Standardization) 13468-1 (1996).

<Fibrous Silver Particles-Containing Layer>

The fibrous silver particles-containing layer contains fibrous silver particles.

In the fibrous silver particles-containing layer, a void size is preferably small, in order to reflect far infrared rays. In a cross section of the fibrous silver particles-containing layer, for example, it is more preferable that 80% or more of voids have a void area of 25 µm$^2$ or less.

(Fibrous Silver Particles)

The fibrous silver particles have a fibrous shape and the fibrous shape has the same meaning as a wire shape or a liner shape.

The fibrous silver particles have conductivity.

As the fibrous silver particles, silver nanowires, or rod-shaped silver particles can be used. Silver nanowires are preferable as the fibrous silver particles. Hereinafter, the silver nanowires will be described as a representative example of the fibrous silver particles, but the description of the silver nanowires can be used as general description of the fibrous silver particles.

The fibrous silver particles-containing layer preferably contains fibrous silver particles having an average short axis length equal to or smaller than 150 nm as fibrous silver particles. The average short axis length is preferably equal to or smaller than 150 nm, because heat insulating properties are improved and optical characteristics are hardly deteriorated due to light scattering. The fibrous silver particles such as silver nanowires preferably have a solid structure.

In order to easily form more transparent fibrous silver particles-containing layer, fibrous silver particles having an average short axis length of 1 nm to 150 nm are preferable, for example, as the fibrous silver particles such as silver nanowires.

From easiness of handling at the time of the manufacturing, an average short axis length (average diameter) of the fibrous silver particles such as silver nanowires is preferably equal to or smaller than 100 nm, more preferably equal to or smaller than 60 nm, and even more preferably equal to or smaller than 50 nm, and the average short axis length thereof is particularly preferably equal to or smaller than 25 nm, because more excellent properties with respect to haze are obtained. By setting the average short axis length thereof to be equal to or greater than 1 nm, a fibrous silver particles-containing layer having excellent oxidation resistance and excellent weather fastness is easily obtained. The average short axis length thereof is more preferably equal to or greater than 5 nm, even more preferably equal to or greater than 10 nm, and particularly preferably equal to or greater than 15 nm.

The average short axis length of the fibrous silver particles such as silver nanowires is preferably 1 nm to 100 nm, more preferably 5 nm to 60 nm, even more preferably 10 nm to 60 nm, and particularly preferably 15 nm to 50 nm, from viewpoints of a haze value, oxidation resistance, and weather fastness.

The average long axis length of the fibrous silver particles such as silver nanowires is preferably the same as a wavelength in a reflection band of far infrared rays desired to be reflected, in order to easily perform reflection in the reflection band of far infrared rays desired to be reflected. The average long axis length of the fibrous silver particles such as silver nanowires is preferably 5 to 50 µm, in order to easily reflect far infrared rays at a wavelength of 5 to 50 µm, more preferably 5 to 30 µm, and even more preferably 5 to 25 µm. In a case where the average long axis length of the fibrous silver particles is equal to or smaller than 50 µm, synthesis of fibrous silver particles is easily performed without generating aggregates, and in a case where the average long axis length thereof is equal to or greater than 5 µm, sufficient heat insulating properties are easily obtained. In a case where the average long axis length of the fibrous silver particles is equal to or smaller than 30 µm, it is easy to provide a dispersion for forming a far infrared reflective film having excellent stability of a dispersion, and it is easy to improve surface properties of a far infrared reflective film to be obtained.

The average short axis length (average diameter) and the average long axis length of fibrous silver particles such as silver nanowires can be acquired by observing a transmission electron microscope (TEM) image or an optical microscope image by using a TEM and an optical microscope, for example. Specifically, regarding the average short axis length (average diameter) and the average long axis length of the fibrous silver particles such as silver nanowires, short axis lengths and long axis lengths of 300 fibrous silver particles randomly selected are measured by using a transmission electron microscope (JEOL, Ltd., product name: JEM-2000FX) and the average short axis length and the average long axis length of the fibrous silver particles such as silver nanowires can be acquired from the average values thereof. In this specification, the values obtained by using this method are used. Regarding the short axis length in a case where a cross section of the fibrous silver particles in a short axis direction does not have a circular shape, a length of the longest portion obtained by measuring a length in a short axis direction is set as the short axis length. In addition, in a case where the fibrous silver particles such as silver nanowires are curved, a circle having the curved shape as an arc is considered, and a value calculated from the radius thereof and curvature is set as the long axis length.

In the embodiment, a content of fibrous silver particles such as silver nanowires having a short axis length (diameter) equal to or smaller than 150 nm and a long axis length of 5 µm to 50 µm with respect to a content of fibrous silver particles such as the entire silver nanowires of the fibrous silver particles-containing layer is preferably equal to or greater than 50% by mass, more preferably equal to or greater than 60% by mass, and even more preferably equal to or greater than 75% by mass, in terms of the metal amount.

A rate of the fibrous silver particles such as silver nanowires having a short axis length (diameter) equal to or smaller than 150 nm and a long axis length of 5 µm to 30 µm is equal to or greater than 50% by mass, and therefore, in a configuration in which conductive particles other than the fibrous silver particles are not substantially contained in the fibrous silver particles-containing layer, a decrease in transparency can be avoided, even in a case of strong plasmon absorption.

A coefficient of variation of the short axis lengths (diameters) of the fibrous silver particles such as silver nanowires used in the fibrous silver particles-containing layer is preferably equal to or smaller than 40%, more preferably equal to or smaller than 35%, and even more preferably equal to or smaller than 30%.

The coefficient of variation is preferably equal to or smaller than 40%, from a viewpoint of transparency and heat insulating properties, because a proportion of silver nanowires which easily reflect far infrared rays at a wavelength of 5 to 50 µm is increased.

The coefficient of variation of the short axis lengths (diameters) of the fibrous silver particles such as silver nanowires can be acquired by measuring short axis lengths (diameters) of 300 nanowires randomly selected from a transmission electron microscope (TEM), for example, calculating a standard deviation and an arithmetic mean value thereof, and dividing the standard deviation by the arithmetic mean value.

An aspect ratio of the fibrous silver particles such as silver nanowires used in the invention is preferably equal to or greater than 10. Here, the aspect ratio means a ratio of the average long axis length to the average short axis length (average long axis length/average short axis length). The aspect ratio can be calculated from the average long axis length and the average short axis length calculated by using the method described above.

The aspect ratio of the fibrous silver particles such as silver nanowires is not particularly limited, can be suitably selected according to the purpose, and is preferably 10 to 100,000, more preferably 50 to 100,000, and even more preferably 100 to 100,000.

In a case where the aspect ratio is equal to or greater than 10, a network in which the fibrous silver particles such as silver nanowires are in contact with each other is easily formed, and a fibrous silver particles-containing layer having high heat insulating properties is easily obtained. In a case where the aspect ratio is equal to or smaller than 100,000, formation of aggregates due to a tangle of the fibrous silver particles such as silver nanowires is prevented, in a coating solution used in a case of providing the fibrous silver particles-containing layer on the support by coating, for example, and a stable coating solution is obtained, and accordingly, the fibrous silver particles-containing layer is easily manufactured.

The content of the fibrous silver particles such as silver nanowires having an aspect ratio equal to or greater than 10 with respect to the mass of the fibrous silver particles such as the entire silver nanowires contained in the fibrous silver particles-containing layer is not particularly limited. The content is, for example, preferably equal to or greater than 70% by mass, more preferably equal to or greater than 75% by mass, and most preferably equal to or greater than 80% by mass.

A shape of the fibrous silver particles such as silver nanowires may be arbitrary shapes such as a cylindrical shape, a rectangular parallelepiped shape, or a columnar shape having a polygonal cross section. In a case where a high transparency is necessary, a cylindrical shape or a polygonal shape having a pentagonal or more polygonal cross section and having a cross sectional shape without a sharp-pointed angle is preferable.

The cross sectional shape of the fibrous silver particles such as silver nanowires can be detected by applying a fibrous silver particle aqueous dispersion such as silver nanowires on a support and observing a cross section with a transmission electron microscope (TEM).

The metal for forming the fibrous silver particles such as silver nanowires is not particularly limited, as long as silver is at least included. In addition to silver, a combination of two or more kinds of metal may be used and an alloy thereof can be used. Among these, the metal is preferably formed of silver alone or a metal compound, and the metal is more preferably formed of silver alone.

As the metal used in the fibrous silver particles, at least one kind of metal selected from the group consisting metals of fourth, fifth, and sixth period in a long-form periodic table (IUPAC (The International Union of Pure and Applied Chemistry) 1991) is preferable, at least one kind of metal selected from second to fourteenth groups is more preferable, and at least one kind of metal selected from the second group, the eighth group, the ninth group, the tenth group, the eleventh group, the twelfth group, the thirteenth group, and the fourteenth group is even more preferable.

Specific examples of the metal used in the fibrous silver particles include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, and an alloy containing any one of these. Among these, copper, silver, gold, platinum, palladium, nickel, tin, cobalt, rhodium, iridium, or an alloy thereof is preferable, palladium, copper, silver, gold, platinum, tin, or an alloy of any one of these is more preferable, and silver or an alloy containing silver is particularly preferable. Here, a content of silver in an alloy containing silver is preferably equal to or greater than 50 mol %, more preferably equal to or greater than 60 mol %, and even more preferably equal to or greater than 80 mol % with respect to the entire quantity of the alloy. In the far infrared reflective film of the invention, it is preferable that the fibrous silver particles described above are formed of silver.

The fibrous silver particles such as silver nanowires contained in the fibrous silver particles-containing layer preferably contains silver nanowires, from a viewpoint of realizing high heat insulating properties. It is more preferable to contain silver nanowires having an average short axis length of 1 nm to 150 nm and an average long axis length of 1 μm to 30 μm and even more preferable to contain silver nanowires having an average short axis length of 5 nm to 30 nm and an average long axis length of 5 μm to 30 μm. The content of silver nanowires with respect to the mass of the fibrous silver particles such as the entire silver nanowires contained in the fibrous silver particles-containing layer is not particularly limited, as long as it does not disturb the effects of the invention. The content of silver nanowires with respect to the mass of the fibrous silver particles such as the entire silver nanowires contained in the fibrous silver particles-containing layer is, for example, preferably equal to or greater than 50% by mass and more preferably equal to or greater than 80% by mass, and it is even more preferable that the fibrous silver particles such as the entire silver nanowires are substantially silver nanowires. Here, the term "substantially" means that inevitably mixed metal atoms other than silver are accepted.

In the far infrared reflective film of the invention, a content per unit area of the fibrous silver particles constituting the fibrous silver particles-containing layer is preferably 0.020 to 0.200 g/m$^2$. In this range, the content per unit area of the fibrous silver particles such as silver nanowires contained in the fibrous silver particles-containing layer is preferably set as an amount so that heat insulating properties, resistivity, and visible light transmittance of the fibrous silver particles-containing layer are in desired ranges, in accordance with the type of the fibrous silver particles such as silver nanowires. The content per unit area of the fibrous silver particles such as silver nanowires contained in the fibrous silver particles-containing layer (content (gram) per unit area of the fibrous silver particles such as silver nanowires per 1 m$^2$ of the fibrous silver particles-containing layer) is preferably in a range of 0.036 to 0.150 g/m$^2$, more preferably in a range of 0.036 to 0.120 g/m$^2$, and particularly preferably in a range of 0.040 to 0.100 g/m$^2$.

At this time, the mass per unit area of the fibrous metal particles-containing layer (coating amount of total solid contents of a coating solution at the time of preparing a film) is selected so that heat insulating properties and visible light transmittance of the fibrous metal particles-containing layer are in desired ranges. In a case where the coating amount is sufficiently great, sufficient heat insulating properties are obtained, and in a case where the coating amount is not excessively great, visible light transmittance can be increased, an increase in haze value hardly occurs, and defects such as cracks or peeling of the fibrous metal particles-containing layer hardly occurs. In a case where the amount of the fibrous silver particles is in the range described above, the mass per unit area of the fibrous silver particles-containing layer (coating amount of total solid contents of a coating solution at the time of preparing a film) is preferably in a range of 0.110 to 2.000 g/m$^2$, more preferably in a range of 0.150 to 1.000 g/m$^2$, and particularly preferably in a range of 0.200 to 0.900 g/m$^2$.

The amount of fibrous silver particles with respect to the fibrous silver particles-containing layer is preferably 1% to 35% by mass, more preferably 3% to 30% by mass, and particularly preferably 5% to 25% by mass.

—Manufacturing Method of Fibrous Silver Particles—

The fibrous silver particles such as silver nanowires are not particularly limited and may be manufactured by any method. As will be described below, it is preferable that the fibrous silver particles are manufactured by reducing metal ions in a solvent obtained by dissolving a halogen compound and a dispersing agent. After fibrous silver particles such as silver nanowires are formed, desalinization treatment is performed in a routine procedure, and this operation is preferable from viewpoints of dispersibility and temporal stability of the fibrous silver particles-containing layer.

As the manufacturing method of the fibrous silver particles such as silver nanowires, methods disclosed in JP2009-215594A, JP2009-242880A, JP2009-299162A, JP2010-84173A, and JP2010-86714 can be used.

As a solvent used in the manufacturing of the fibrous silver particles such as silver nanowires, a hydrophilic solvent is preferable, and examples thereof include water, an alcohol solvent, an ether solvent, and a ketone solvent. These may be used alone or in combination of two or more kinds thereof.

Examples of the alcohol solvent include methanol, ethanol, propanol, isopropanol, butanol, and ethylene glycol.

Examples of the ether solvent include dioxane and tetrahydrofuran.

Examples of the ketone solvent include acetone and the like.

In a case of performing heating, a heating temperature thereof is preferably equal to or lower than 250° C., more preferably 20° C. to 200° C., even more preferably 30° C. to 180° C., and particularly preferably 40° C. to 170° C. By setting the temperature to be equal to or higher than 20° C., a length of the fibrous silver particles such as silver nanowires formed is in a preferable range so as to ensure dispersion stability, and by setting the temperature to be equal to or lower than 250° C., the periphery of the cross section of the silver nanowires has a smooth shape without acute angles, and accordingly, coloration due to surface plasmon absorption of the metal particles is prevented. Therefore, the range thereof is preferable from a viewpoint of transparency.

The temperature may be changed during a particle formation process, if necessary, and the temperature change during the process may have effects of control of nucleus formation or prevention of regeneration of nucleus, and improvement of monodispersity due to improvement of selective growth.

The heating process is preferably performed by adding a reducing agent.

The reducing agent is not particularly limited and can be suitably selected from elements normally used. Examples thereof include borohydride metal salt, aluminum hydride salt, alkanolamine, aliphatic amine, heterocyclic amine, aromatic amine, aralkyl amine, alcohols, organic acids, reducing sugars, sugar alcohols, sodium sulfite, hydrazine compounds, dextrin, hydroquinone, hydroxylamine, ethylene glycol, and glutathione. Among these, reducing sugars, sugar alcohols as a derivative thereof, and ethylene glycol are particularly preferable.

As a reducing agent, a compound having a function as both of a dispersing agent or a solvent can be preferably used, in the same manner.

The fibrous silver particles such as silver nanowires are preferably manufactured by adding a dispersing agent and halogen compounds or metal halide fine particles.

The timing of adding a dispersing agent and halogen compounds may be before adding a reducing agent or after adding a reducing agent or may be before adding metal ions or metal halide fine particles or after adding metal ions or metal halide fine particles. In order to obtain fibrous silver particles having better monodispersity, the adding of halogen compounds is preferably divided into two or more steps, because nucleus formation and growth can be controlled.

The step of adding a dispersing agent is not particularly limited. A dispersing agent may be added before preparing the fibrous silver particles such as silver nanowires and the fibrous silver particles such as silver nanowires may be added under the presence of the dispersing agent, or a dispersing agent may be added after preparing the fibrous silver particles such as silver nanowires, in order to control a dispersion state.

Examples of the dispersing agent include an amino group-containing compound, a thiol group-containing compound, a sulfide group-containing compound, amino acid or a derivative thereof, a peptide compounds, polysaccharides, a polysaccharides-derived natural polymer, a synthetic polymer, and polymer compounds such as gel derived therefrom.

Among these, various polymer compounds used as a dispersing agent are compounds contained in polymers which will be described below.

Preferable examples of polymers used as a dispersing agent include polymers including a hydrophilic group such as gelatin, polyvinyl alcohol, methyl cellulose, hydroxypropyl cellulose, polyalkylene amine, partial alkyl ester of polyacrylic acid, polyvinyl pyrrolidone, a copolymer having a polyvinyl pyrrolidone structure, and polyacrylic acid having an amino group or a thiol group which are protective colloid polymers.

A weight-average molecular weight of the polymer used as a dispersing agent measured by using gel permeation chromatography is preferably 3,000 to 300,000 and more preferably 5,000 to 100,000.

The description in "Genryo No Jiten" (edited by Seijiro Ito, published by Asakura Publishing, 2000) can be referred for the structure of a compound capable of being used as a dispersing agent.

A shape of silver nanowires obtained can be changed depending on the kind of a dispersing agent used.

The halogen compound is not particularly limited, as long as it is a compound containing bromine, chlorine, and iodine, and can be suitably selected according to the purpose. Preferable examples thereof include alkali halide such as sodium bromide, sodium chloride, sodium iodide, potassium iodide, potassium bromide, or potassium chloride, or a compound capable of being used in combination with the following dispersion additive.

The halogen compound may function as a dispersion additive and the dispersion additive can be preferably used in the same manner.

Silver halide fine particles may be used as a substitute of the halogen compound, or a halogen compound and silver halide fine particles may be used in combination.

In addition, a single substance having both a function of a dispersing agent and a function of a halogen compound may be used. That is, both functions of a dispersing agent and a halogen compound are realized with one compound, by using a halogen compound having a function as a dispersing agent.

Examples of the halogen compound having a function as a dispersing agent include hexadecyl-trimethyl ammonium bromide containing an amino group and bromide ions, hexadecyl-trimethyl ammonium chloride containing an amino group and chloride ions, dodecyltrimethylammonium bromide containing an amino group and bromide ions or chloride ions, dodecyltrimethylammonium chloride, stearyltrimethylammonium bromide, stearyltrimethylammonium chloride, decyltrimethylammonium bromide, decyltrimethylammonium chloride, dimethyldistearylammonium bromide, dimethyldistearylammonium chloride, dilauryldimethylammonium bromide, dilauryldimethylammonium chloride, dimethyldipalmitylammonium bromide, and dimethyldipalmitylammonium chloride.

In the manufacturing method of the fibrous silver particles such as silver nanowires, it is preferable to perform desalinization treatment after forming the silver nanowires. The desalinization treatment after forming the fibrous silver particles such as silver nanowires can be performed by using methods such as ultrafiltration, dialysis, gel filtration, decantation, and centrifugal separation.

It is preferable that the fibrous silver particles such as silver nanowires do not contain inorganic ions such as alkali metal ions, alkali earth metal ions, and halide ions, if possible. Electric conductivity of a dispersed material obtained by dispersing silver nanowires in an aqueous solvent is preferably equal to or smaller than 1 mS/cm, more preferably equal to or smaller than 0.1 mS/cm, and even more preferably equal to or smaller than 0.05 mS/cm.

Viscosity of the aqueous dispersed material of the fibrous silver particles such as silver nanowires at 25° C. is preferably 0.5 mPa·s to 100 mPa·s and more preferably 1 mPa·s to 50 mPa·s.

The electric conductivity and the viscosity are measured by setting concentration of the fibrous silver particles such as silver nanowires in the aqueous dispersed material as 0.45% by mass. In a case where the concentration of the fibrous silver particles such as silver nanowires in the aqueous dispersed material is higher than the above-mentioned concentration, the measurement is performed by diluting the aqueous dispersed material with a distilled water.

An average film thickness of the fibrous silver particles-containing layer is normally selected from a range of 0.005 μm to 2 μm. For example, by setting the average film thickness thereof to be 0.001 μm to 0.5 μm, sufficient durability and film hardness are obtained. Particularly, the average film thickness thereof is preferably in a range of 0.01 μm to 0.2 μm, because the allowable range in the manufacturing can be ensured.

In the invention, by providing a fibrous silver particles-containing layer including fibrous silver particles, and a sol-gel hardened material obtained by hydrolysis and polycondensation of a metal coupling agent including a functional group capable of interacting with the fibrous silver particles, and an alkoxide compound, high heat insulating properties can be maintained, fibrous silver particles such as silver nanowires are stably solidified due to a sol-gel hardened material, and high film hardness can be realized.

In addition, it is preferable that, by providing a fibrous silver particles-containing layer satisfying at least one of the following condition (i) or (ii), high heat insulating properties can be maintained, fibrous silver particles such as silver nanowires are stably solidified due to a sol-gel hardened material, and high film hardness can be realized. Even in a case where the fibrous silver particles-containing layer is a thin layer having a film thickness of 0.005 μm to 0.5 μm, for example, it is possible to obtain a fibrous silver particles-containing layer having abrasion resistance, heat resistance, moist heat resistance, and bending resistance without practical problems. Accordingly, the far infrared reflective film of the embodiment of the invention is suitably used for various purposes. In an aspect where it is necessary to provide a thin layer, a film thickness thereof may be 0.005 μm to 0.5 μm, preferably 0.007 μm to 0.3 μm, more preferably 0.008 μm to 0.25 μm, and most preferably 0.01 μm to 0.2 μm. By setting the fibrous silver particles-containing layer to be a thinner layer as described above, transparency of the fibrous silver particles-containing layer is further improved.

Regarding an average film thickness of the fibrous silver particles-containing layer, film thicknesses of five spots of the fibrous silver particles-containing layer are measured by directly observing the cross section of the fibrous silver particles-containing layer using an electron microscope, and an arithmetic mean value thereof is calculated. In addition, the film thickness of the fibrous silver particles-containing layer can also be measured as a level difference between a portion where the fibrous silver particles-containing layer is formed and a portion where the fibrous silver particles-containing layer is removed, by using a stylus type surface shape measurement device (Dektak (registered trademark) 150, manufactured by Bruker AXS K.K). However, some parts of the support may be removed in a case of removing the fibrous silver particles-containing layer and an error regarding the fibrous silver particles-containing layer formed easily occurs, because the fibrous silver particles-containing layer is a thin film. Therefore, in the following examples, the average film thickness measured by using an electron microscope is shown.

(Sol-Gel Hardened Material)

The fibrous silver particles-containing layer of the far infrared reflective film of the invention contains a sol-gel hardened material obtained by hydrolysis and polycondensation of a metal coupling agent including a functional group capable of interacting with the fibrous silver particles, and an alkoxide compound.

(Metal Coupling Agent Including Functional Group Capable of Interacting with Fibrous Silver Particles)

The metal coupling agent including a functional group capable of interacting with the fibrous silver particles includes a functional group capable of interacting with the fibrous silver particles.

The functional group capable of interacting with the fibrous silver particles indicates a functional group which allows interactions such as covalent bond, ionic bond (electrostatic attraction), coordinate bond, or Van der Waals force, between the fibrous silver particles and the functional group.

The metal coupling agent indicates a compound including a central metal element, an organic functional group, and a hydrolysable group. The metal coupling agent used in the invention at least includes a functional group capable of interacting with the fibrous silver particles as the organic functional group. In addition, the metal coupling agent used in the invention may not be subjected to a coupling reaction with the fibrous silver particles or may not be subjected to a coupling reaction with the alkoxide compound.

The functional group capable of interacting with the fibrous silver particles, included in the metal coupling agent including a functional group capable of interacting with the fibrous silver particles, is not particularly limited, a well-known functional group can be used, and a functional group capable of allowing covalent bond with the fibrous silver particles is preferable.

In the metal coupling agent including the functional group capable of interacting with the fibrous silver particles used in the invention, the functional group capable of interacting with the fibrous silver particles is preferably selected from the group consisting of an amide group, an amino group, a mercapto group, a phosphoric acid group, a phosphonic acid group, an isocyanate group, a carboxylic acid group, a sulfonic acid group, and a salt of these groups, more preferably selected from an amino group, a mercapto group, and an isocyanate group, and particularly preferably a mercapto group.

In addition, examples of a functional group not capable of interacting with the fibrous silver particles include a methyl group and a glycidoxypropyl group.

The metal coupling agent including a functional group capable of interacting with the fibrous silver particles is not particularly limited, as long as it is a metal coupling agent including a functional group capable of interacting with the fibrous silver particles, and examples thereof include a compound including a ureido group, for example, ureidopropyltriethoxysilane, a compound including an amino group, for example, N-2-(aminoethyl)-3-aminopropyltrimethoxysilane or 3-aminopropyltriethoxysilane, a compound including a mercapto group, for example, 3-mercaptopropyltrimethoxysilane or 3-mercaptopropylmethyldimethoxysilane, and a compound including an isocyanate group, for example, 3-isocyanatepropyltriethoxysilane.

The metal coupling agent including the functional group capable of interacting with the fibrous silver particles used in the invention preferably satisfies the number of atom linking chains between the functional group capable of interacting with the fibrous silver particles and a central metal element of the metal coupling agent which is 3 to 6, from a viewpoint of increasing stability of a dispersion, more preferably satisfies the number of atom linking chains which is 3 to 5, and particularly preferably satisfies the number of atom linking chains which is 3 or 4.

It is assumed that, in a case where the number of atom linking chains between the functional group capable of interacting with the fibrous silver particles and the central metal element of the metal coupling agent is equal to or greater than 3, steric hindrance is suppressed and the coupling agent is easily adsorbed to the fibrous silver particles. Thus, it is thought that the fibrous silver particles are easily dispersed. It is assumed that, in a case where the number of atom linking chains between the functional group capable of interacting with the fibrous silver particles and the central metal element of the metal coupling agent is equal to or smaller than 6, the fibrous silver particles are hardly combined with each other. Thus, it is thought that the fibrous silver particles are hardly aggregated with each other.

The atom linking chain between the functional group capable of interacting with the fibrous silver particles and the central metal element of the metal coupling agent is preferably an atom linking chain of at least one kind of atoms selected from a carbon atom, a nitrogen atom, and an oxygen atom.

The metal coupling agent including the functional group capable of interacting with the fibrous silver particles used in the invention is preferably a metal coupling agent including an element selected from the group consisting of Si, Ti, Zr, and Al (as the central metal element) and more preferably a metal coupling agent including a Si element (as the central metal element).

In the far infrared reflective film of the invention, a mass ratio of a content of the metal coupling agent including the functional group capable of interacting with the fibrous silver particles with respect to the content of the fibrous silver particles constituting the fibrous silver particles-containing layer is preferably 0.0005/1 to 0.05/1, more preferably 0.0008/1 to 0.008/1, and particularly preferably 0.001/1 to 0.01/1.

(Alkoxide Compound)

The alkoxide compound used in the invention is not particularly limited and is preferably a metal alkoxide compound including a central metal element.

The alkoxide compound is preferably an alkoxide compound including an element selected from the group consisting of Si, Ti, Zr, and Al (as the central metal element) and more preferably an alkoxide compound including a Si element (as the central metal element).

The content of the alkoxide compound per unit area of the fibrous silver particles-containing layer is preferably in a range of 0.1 to 2.0 g/m², more preferably in a range of 0.3 to 1.5 g/m², and particularly preferably in a range of 0.5 to 1.4 g/m².

In a general method, in a case of increasing the amount of the sol-gel hardened material, in order to increase film hardness of the far infrared reflective film, stability of the coating solution tends to be decreased (an increase in viscosity). However, with a configuration of the invention, it is possible to increase stability of a coating solution, even in a case where the amount of the sol-gel hardened material is increased, and excellent surface properties of a far infrared reflective film to be obtained can be realized.

(Structure of Sol-Gel Hardened Material)

The fibrous silver particles-containing layer includes the sol-gel hardened material obtained by hydrolysis and polycondensation of the metal coupling agent including the functional group capable of interacting with the fibrous silver particles, and the alkoxide compound.

The fibrous silver particles-containing layer preferably includes the sol-gel hardened material obtained by hydrolysis and polycondensation of an alkoxide compound of an element (b) selected from the group consisting of Si, Ti, Zr, and Al.

In the fibrous silver particles-containing layer, it is preferable that the sol-gel hardened material has a partial structure represented by General Formula 1 and has at least one partial structure selected from the group consisting of a partial structure represented by General Formula 2 and a partial structure represented by General Formula 3. However, at least one of the partial structures of General Formulae 2 and 3 includes a partial structure derived from the metal coupling agent including the functional group capable of interacting with the fibrous silver particles, that is, $R^2$ included in the sol-gel hardened material includes at least one kind of the functional group capable of interacting with the fibrous silver particles.

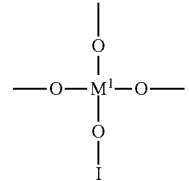

General Formula 1

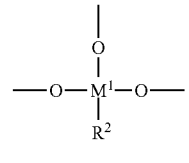

General Formula 2

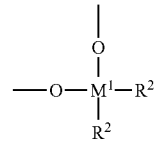

General Formula 3

In General Formulae 1 to 3, $M^1$'s each independently represent an element selected from the group consisting of Si, Ti, Zr, and Al and $R^2$'s each independently represent a hydrogen atom or an organic functional group.

An alkoxide compound having the partial structure represented by General Formula 1, an alkoxide compound having the partial structure represented by General Formula 2, and an alkoxide compound having the partial structure represented by General Formula 3 are also referred to as a specific alkoxide compound. A preferable range of the specific alkoxide compound is the same as the preferable range of the alkoxide compound having the partial structure represented by General Formulae 1 to 3 described in the section of the sol-gel hardened material.

The sol-gel hardened material is preferably a sol-gel hardened material having the partial structure represented by General Formula 1 and the partial structure represented by General Formula 2, a sol-gel hardened material having the partial structure represented by General Formula 1 and the partial structure represented by General Formula 3, and a sol-gel hardened material having the partial structure represented by General Formula 1, the partial structure represented by General Formula 2, and the partial structure represented by General Formula 3. However, at least one of the partial structures of General Formulae 2 and 3 includes a partial structure derived from the metal coupling agent including the functional group capable of interacting with the fibrous silver particles, that is, $R^2$ included in the sol-gel hardened material includes at least one kind of the functional group capable of interacting with the fibrous silver particles.

In General Formulae 1 to 3, $M^1$'s each independently represent an element selected from the group consisting of Si, Ti, Zr, and Al, that is, in the far infrared reflective film of the invention, the metal coupling agent and the alkoxide compound described above are preferably each independently a metal coupling agent and an alkoxide compound including an element selected from the group consisting of Si, Ti, Zr, and Al. $M^1$ is preferably Si, from a viewpoint of obtaining further excellent film hardness of the far infrared reflective film. That is, in the far infrared reflective film of the invention, the metal coupling agent and the alkoxide compound described above are respectively preferably a metal coupling agent and an alkoxide compound including a Si element.

In General Formulae 1 to 3, $R^2$ represents a hydrogen atom or an organic functional group and is preferably a hydrocarbon group or the functional group capable of interacting with the fibrous silver particles. As the hydrocarbon group represented by $R^2$, an alkyl group or an aryl group is preferably used, and the hydrocarbon group may be substituted with the functional group capable of interacting with the fibrous silver particles. A preferable range of the functional group capable of interacting with the fibrous silver particles represented by $R^2$ is the same as the preferable range of the functional group capable of interacting with the fibrous silver particles included in the metal coupling agent including the functional group capable of interacting with the fibrous silver particles.

The number of carbon atoms in a case where $R^2$ represents an alkyl group is preferably 1 to 18, more preferably 1 to 8, and even more preferably 1 to 4. In addition, in a case where $R^2$ represents an aryl group, a phenyl group is preferable.

An alkyl group or an aryl group of $R^2$ may include a substituent. Examples of a substituent capable of being introduced include a halogen atom, an acyloxy group, an alkenyl group, an acryloyloxy group, a methacryloyloxy group, an amide group, an amino group, an alkylamino group, a mercapto group, an epoxy group, a phosphoric acid group, a phosphonic acid group, an isocyanate group, a carboxylic acid group, and a sulfonic acid group, and the functional group capable of interacting with the fibrous silver particles is more preferable.

In the sol-gel hardened material, it is preferable that the metal coupling agent including a functional group capable of interacting with fibrous silver particles described above has a partial structures of General Formula 2 or 3 and the alkoxide compound has a partial structure represented by General Formula 1.

The sol-gel hardened material described above is, for example, preferably obtained by hydrolysis and polycondensation of an alkoxide compound (tetraalkoxide compound) which is an element having a partial structure represented by General Formula 1 and selected from the group consisting of Si, Ti, Zr, and Al, and an alkoxide compound (also collectively referred to as an organoalkoxide compound) which is an element selected from the group consisting of Si, Ti, Zr, and Al having at least one partial structure selected from the group consisting of an alkoxide compound (trialkoxide compound) which is an element having a partial structure represented by General Formula 2 and selected from the group consisting of Si, Ti, Zr, and Al, and an alkoxide compound (dialkoxide compound) which is an element having a partial structure represented by General Formula 3 and selected from the group consisting of Si, Ti, Zr, and Al.

In a preferred aspect, the sol-gel hardened material described above can be obtained by hydrolysis and polycondensation of an alkoxysilane compound (tetraalkoxysilane) having a partial structure represented by General Formula 1, and an alkoxysilane compound (also collectively referred to as an organoalkoxysilane) having at least one partial structure selected from the group consisting of an alkoxysilane compound (trialkoxysilane) having a partial structure represented by General Formula 2 and an alkoxysilane compound (dialkoxysilane) having a partial structure represented by General Formula 3, which is a metal coupling agent having a functional group capable of interacting with metal coupling agent fibrous silver particles.

Hereinafter, specific examples of the alkoxysilane compound (tetraalkoxysilane compound) having a partial structure represented by General Formula 1 are used, but the invention is not limited thereto.

In a case where $M^1$ is Si in the alkoxysilane compound having a partial structure represented by General Formula 1, examples of tetrafunctional tetraalkoxysilane include tetramethoxysilane, tetraethoxysilane, tetrapropoxysilane, tetrabutoxylane, methoxytriethoxysilane, ethoxytrimethoxysilane, methoxytripropoxysilane, ethoxytripropoxysilane, propoxytrimethoxysilane, propoxytriethoxysilane, and dimethoxydiethoxysilane. Among these, tetramethoxysilane and tetraethoxysilane are particularly preferable.

In a case where $M^1$ is Ti in the alkoxysilane compound having a partial structure represented by General Formula 1, examples of tetrafunctional tetraalkoxy titanate include tetramethoxy titanate, tetraethoxy titanate, tetrapropoxy titanate, tetraisopropoxy titanate, and tetrabutoxy titanate.

In a case where $M^1$ is Zr in the alkoxysilane compound having a partial structure represented by General Formula 1, examples of tetrafunctional tetraalkoxyzirconium include zirconate corresponding to a compound exemplified as tetraalkoxy titanate.

In a case where $M^1$ is Al in the alkoxysilane compound having a partial structure represented by General Formula 1, examples of tetrafunctional tetraalkoxy aluminum include aluminate corresponding to a compound exemplified as tetraalkoxy titanate.

Next, specific examples of the organoalkoxide compound having a partial structure represented by General Formula 2 or General Formula 3 are used, but the invention is not limited thereto. However, in the invention, at least one kind of the metal coupling agent including the functional group capable of interacting with the metal coupling agent fibrous silver particles, and thus, at least one kind of the organoalkoxide compound having a partial structure represented by General Formula 2 or General Formula 3 which is the metal coupling agent including the functional group capable of interacting with the metal coupling agent fibrous silver particles is preferably used among the following specific examples.

In a case where $M^1$ is Si in the organoalkoxide compound having a partial structure represented by General Formula 3, examples of bifunctional organoalkoxysilane include dimethyldimethoxysilane, diethyldimethoxysilane, propylmethyldimethoxysilane, dimethyldiethoxysilane, diethyldiethoxysilane, dipropyldiethoxysilane, γ-chloropropylmethyldiethoxysilane, γ-chloropropyldimethyl dimethoxysilane, chlorodimethyldiethoxysilane, (parachloromethyl) phenylmethyldimethoxysilane, γ-bromopropyl methyl dimethoxysilane, acetoxymethyl methyl diethoxysilane, acetoxymethyl methyl dimethoxysilane, acetoxypropyl methyl dimethoxysilane, benzoyl oxypropyl methyl dimethoxysilane, 2-(carbomethoxy) ethyl methyl dimethoxysilane, phenylmethyldimethoxysilane, phenylmethyldiethoxysilane, phenylmethyldipropoxysilane, hydroxymethylmethyl diethoxysilane, N-(methyldiethoxysilylpropyl)-O-polyethylene oxide urethane, N-(3-methyldiethoxysilylpropyl)-4-hydroxybutyramide, N-(3-methyldiethoxysilylpropyl) gluconamide, vinylmethyldimethoxysilane, vinylmethyldiethoxysilane, vinylmethyldibutoxysilane, isopropenyl methyl dimethoxysilane, isopropenyl methyl diethoxysilane, isopropenyl methyl dibutoxysilane, vinyl methyl bis(2-methoxyethoxy) silane, allyl methyl dimethoxysilane, vinyl decyl methyl dimethoxysilane, vinyl octyl methyl dimethoxysilane, vinyl phenyl methyl dimethoxysilane, isopropenyl phenyl methyl dimethoxysilane, 2-(meth)acryloxyethylmethyl dimethoxysilane, 2-(meth)acryloxyethylmethyl diethoxysilane, 3-(meth)acryloxypropylmethyl dimethoxysilane, 3-(meth)acryloxypropylmethyl bis(2-methoxyethoxy)silane, 3-[2-(allyloxycarbonyl) phenylcarbonyloxy] propylmethyldimethoxysilane, 3-(vinylphenylamino) propylmethyldimethoxysilane, 3-(vinylphenyl amino) propylmethyldiethoxysilane, 3-(vinylbenzylamino) propylmethyldiethoxysilane, 3-[2-(N-vinylphenylmethylamino) ethylamino] propylmethyldimethoxysilane, 3-[2-(N-isopropenylphenylmethylamino) ethylamino] propylmethyldimethoxysilane, 2-(vinyloxy) ethylmethyldimethoxysilane, 3-(vinyloxy) propylmethyldimethoxysilane, 4-(vinyloxy) butylmethyldiethoxysilane, 2-(isopropenyloxy) ethylmethyldimethoxysilane, 3-(allyloxy) propylmethyldimethoxysilane, 10-(allyloxycarbonyl) decylmethyldimethoxysilane, 3-(isopropenylmethyloxy) propylmethyldimethoxysilane, 10-(isopropenylmethyloxycarbonyl) decylmethyldimethoxysilane, 3-[(meth)acryloxypropyl] methyldimethoxysilane, 3-[(meth)acryloxypropyl] methyldiethoxysilane, 3-[(meth)acryloxymethyl] methyldimethoxysilane, 3-[(meth)acryloxymethyl] methyldiethoxysilane, γ-glycidoxypropylmethyl dimethoxysilane, N-[3-(meth)acryloxy-2-hydroxypropyl]-aminopropylmethyldiethoxysilane, 0-[(meth)acryloxyethyl]-N-(methyldiethoxysilylpropyl) urethane, γ-glycidoxypropylmethyldiethoxysilane, β-(3,4-epoxycyclohexyl) ethylmethyldimethoxysilane, γ-aminopropylmethyl diethoxysilane, γ-aminopropylmethyl dimethoxysilane, 4-aminobutylmethyldiethoxysilane, 11-aminoundecylmethyl diethoxysilane, metaaminophenylmethyl dimethoxysilane, para-aminophenylmethyldimethoxysilane, 3-aminopropylmethyl bis(methoxyethoxyethoxy)silane, 2-(4-pyridylethyl) methyldiethoxysilane, 2-(methyldimethoxysilylethyl) pyridine, N-(3-methyldimethoxysilylpropyl) pyrrole, 3-(metaaminophenoxy) propylmethyldiethoxysilane, N-(2-aminoethyl)-3-aminopropylmethyldimethoxysilane, N-(2-aminoethyl)-3-aminopropylmethyldiethoxysilane, N-(6-aminohexyl) aminomethylmethyldiethoxysilane, N-(6-aminohexyl) aminopropylmethyldimethoxysilane, N-(2-aminoethyl)-11-aminoundecylmethyl dimethoxysilane, (aminoethylaminomethyl) phenethylmethyl dimethoxysilane, N-3-[(amino (polypropyleneoxy))] aminopropylmethyl dimethoxysilane, n-butylaminopropylmethyl dimethoxysilane, N-ethylaminoisobutylmethyl dimethoxysilane, N-methylaminopropylmethyl dimethoxysilane, N-phenyl-γ-aminopropylmethyl dimethoxysilane, N-phenyl-γ-aminomethylmethyl diethoxysilane, (cyclohexylaminomethyl) methyldiethoxysilane, N-cyclohexylaminopropylmethyl dimethoxysilane, bis(2-hydroxyethyl)-3-aminopropylmethyldiethoxysilane, diethylaminomethylmethyl diethoxysilane, diethylaminopropylmethyl dimethoxysilane, dimethylaminopropylmethyl dimethoxysilane, N-3-methyldimethoxysilylpropyl-metaphenylene diamine, N, N-bis[3-(methyldimethoxysilyl) propyl] ethylenediamine, bis(methyldiethoxysilylpropyl) amine, bis(methyldimethoxysilylpropyl) amine, bis[(3-methyldimethoxysilyl) propyl]-ethylenediamine, bis[3-(methyldiethoxysilyl) propyl] urea, bis(methyldimethoxysilylpropyl) urea, N-(3-methyldiethoxysilylpropyl)-4,5-dihydroimidazole, ureidopropylmethyldiethoxysilane, ureidopropylmethyldimethoxysilane, acetamidopropylmethyl dimethoxysilane, 2-(2-pyridylethyl) thiopropylmethyldimethoxysilane, 2-(4-pyridylethyl) thiopropylmethyldimethoxysilane, bis[3-(methyldiethoxysilyl) propyl] disulfide, 3-(methyldiethoxysilyl) propylsuccinic anhydride, 3-mercaptopropylmethyl dimethoxysilane, 3-mercaptopropylmethyl diethoxysilane, isocyanatopropylmethyl dimethoxysilane, isocyanatopropylmethyl diethoxysilane, isocyanatoethylmethyl diethoxysilane, isocyanatomethylmethyl diethoxysilane, carboxyethylmethylsilanediol sodium salt, N-(methyldimethoxysilylpropyl) ethylenediamine triacetate trisodium salt, 3-(methyldihydroxysilyl)-1-propanesulfonic acid, diethyl phosphate ethyl methyl diethoxysilane, 3-methyl dihydroxysilyl propyl methyl phosphonate sodium salt, bis(methyl diethoxysilyl) ethane, bis(methyldiethoxysilyl) ethane, bis(methyldiethoxysilyl) methane, 1,6-bis(methyldiethoxysilyl) hexane, 1,8-bis(methyldiethoxysilyl) octane, parabis(methyldimethoxysilylethyl) benzene, parabis(methyldimethoxysilylmethyl) benzene, 3-methoxypropylmethyl dimethoxysilane, 2-[methoxy (polyethyleneoxy) propyl] methyl dimethoxysilane, methoxytriethyleneoxypropylmethyl dimethoxysilane, tris(3-methyldimethoxysilylpropyl) isocyanurate, [hydroxy (polyethyleneoxy) propyl] methyldiethoxysilane, N,N'-bis (hydroxyethyl)-N,N'-bis(methyldimethoxysilylpropyl) ethylenediamine, bis-[3-(methyldiethoxysilylpropyl)-2-hydroxypropoxy] polyethylene oxide, bis[N,N'-(methyldiethoxysilylpropyl) aminocarbonyl] polyethylene oxide, and bis(methyldiethoxysilylpropyl) polyethylene oxide. Among these, dimethyldimethoxysilane, diethyldimethoxysilane, dimethyldiethoxysilane, and diethyldiethoxysilane are particularly preferable, from a viewpoint of ease of availability and a viewpoint of adhesiveness with a hydrophilic layer.

In a case where $M^1$ is Si in the organoalkoxide compound having a partial structure represented by General Formula 2, examples of trifunctional organoalkoxysilane include methyltrimethoxysilane, ethyltrimethoxysilane, propyltrimethoxysilane, methyltriethoxysilane, ethyltriethoxysilane, propyltriethoxysilane, γ-chloropropyltriethoxysilane, γ-chloropropyltrimethoxysilane, chloromethyltriethoxysilane, (parachloromethyl) phenyltrimethoxysilane, γ-bromopropyltrimethoxysilane, acetoxymethyltriethoxysilane, acetoxymethyltrimethoxysilane, acetoxypropyltrimethoxysilane, benzoyloxypropyltrimethoxysilane, 2-(carbomethoxy) ethyltrimethoxysilane, phenyltrimethoxysilane, phenyltriethoxysilane, phenyltripropoxysilane, hydroxymethyltriethoxysilane, N-(triethoxysilylpropyl)-O-polyethylene oxide urethane, N-(3-triethoxysilylpropyl)-4-hydroxybutyramide, N-(3-triethoxysilylpropyl) gluconamide, vinyltrimethoxysilane, vinyltriethoxysilane, vinyltributoxysilane, isopropenyltrimethoxysilane, isopropenyltriethoxysilane, isopropenyltributoxysilane, vinyltris (2-methoxyethoxy)silane, allyltrimethoxysilane, vinyldecyltrimethoxysilane, vinyloctyltrimethoxysilane, vinylphenyltrimethoxysilane, isopropenylphenyltrimethoxysilane, 2-(meth)acryloxyethyltrimethoxysilane, 2-(meth)acryloxyethyltriethoxysilane, 3-(meth)acryloxypropyltrimethoxysilane, 3-(meth)acryloxy propyl trimethoxysilane, 3-(meth)acryloxypropyl tris(2-methoxyethoxy)silane, 3-[2-(allyloxycarbonyl) phenylcarbonyloxy] propyltrimethoxysilane, 3-(vinylphenylamino) propyltrimethoxysilane, 3-(vinylphenylamino) propyltriethoxysilane, 3-(vinylbenzylamino) propyltriethoxysilane, 3-(vinylbenzylamino) propyltriethoxysilane, 3-[2-(N-vinylphenylmethylamino) ethylamino] propyltrimethoxysilane, 3-[2-(N-isopropenylphenylmethylamino) ethylamino] propyltrimethoxysilane, 2-(vinyloxy) ethyltrimethoxysilane, 3-(vinyloxy) propyltrimethoxysilane, 4-(vinyloxy) butyltriethoxysilane, 2-(isopropenyloxy) ethyltrimethoxysilane, 3-(allyloxy) propyltrimethoxysilane, 10-(allyloxycarbonyl) decyltrimethoxysilane, 3-(isopropenylmethyloxy) propyltrimethoxysilane, 10-(isopropenylmethyloxycarbonyl) decyltrimethoxysilane, 3-[(meth)acryloxypropyl] trimethoxysilane, 3-[(meth)acryloxypropyl] triethoxysilane, 3-[(meth)acryloxymethyl] trimethoxysilane, 3-[(meth)acryloxymethyl] triethoxysilane, γ-glycidoxypropyltrimethoxysilane, N-[3-(meth)acryloxy-2-hydroxypropyl]-3-aminopropyltriethoxysilane, O-[(meth)acryloxyethyl]-N-(triethoxysilylpropyl) urethane, γ-glycidoxypropyltriethoxysilane, β-(3,4-epoxycyclohexyl) ethyltrimethoxysilane, γ-aminopropyltriethoxysilane, γ-aminopropyltrimethoxysilane, 4-aminobutyltriethoxysilane, 11-aminoundecyltriethoxysilane, metaaminophenyltrimethoxysilane, paraaminophenyltrimethoxysilane, 3-aminopropyltris (methoxyethoxyethoxy)silane, 2-(4-pyridylethyl) triethoxysilane, 2-(trimethoxysilylethyl) pyridine, N-(3-trimethoxysilylpropyl) pyrrole, 3-(metaaminophenoxy) propyltrimethoxysilane, N-(2-aminoethyl)-3-aminopropyltrimethoxysilane, N-(2-aminoethyl)-3-aminopropyltriethoxysilane, N-(6-aminohexyl) aminomethyltriethoxysilane, N-(6-aminohexyl) aminopropyltrimethoxysilane, N-(2-aminoethyl)-11-aminoundecyltrimethoxysilane, (aminoethylaminomethyl) phenethyltrimethoxysilane, N-3-[(amino (polypropyleneoxy))] aminopropyltrimethoxysilane, n-butylaminopropyltrimethoxysilane, N-ethylaminoisobutyltrimethoxysilane, N-methylaminopropyltrimethoxysilane, N-phenyl-γ-aminopropyltrimethoxysilane, N-phenyl-γ-aminomethyltriethoxysilane, (cyclohexylaminomethyl) triethoxysilane, N-cyclohexylaminopropyl trimethoxysilane, bis(2-hydroxyethyl)-3-aminopropyltriethoxysilane, diethylaminomethyltriethoxysilane, diethylaminopropyltrimethoxysilane, dimethylaminopropyltrimethoxysilane, N-3-trimethoxysilylpropyl-metaphenylenediamine, N,N-bis [3-(trimethoxysilyl) propyl] ethylenediamine, bis(triethoxysilylpropyl) amine, bis(trimethoxysilylpropyl) amine, bis [(3-trimethoxysilyl) propyl]-ethylenediamine, bis[3-(triethoxysilyl) propyl] urea, bis(trimethoxysilylpropyl) urea, N-(3-triethoxysilylpropyl)-4,5-dihydroimidazole, ureidopropyl triethoxysilane, ureidopropyl trimethoxysilane, acetamidopropyl trimethoxysilane, 2-(2-pyridylethyl) thiopropyltrimethoxysilane, 2-(4-pyridylethyl) thiopropyltrimethoxysilane, bis[3-(triethoxysilyl) propyl] disulfide, 3-(triethoxysilyl) propylsuccinic anhydride, 3-mercaptopropyltrimethoxysilane, 3-mercaptopropyltriethoxysilane, isocyanatopropyltrimethoxysilane, isocyanatopropyltriethoxysilane, isocyanatoethyltriethoxysilane, isocyanatomethyltriethoxysilane, carboxyethylsilanetriol sodium salt, N-(trimethoxysilylpropyl) ethylenediamine triacetate trisodium salt, 3-(trihydroxysilyl)-1-propane sulfonic acid, diethyl phosphate ethyl triethoxysilane, 3-trihydroxysilyl propyl methylphosphonate sodium salt, bis (triethoxysilyl) ethane, bis(trimethoxysilyl) ethane, bis (triethoxysilyl) methane, 1,6-bis(triethoxysilyl) hexane, 1,8-bis(triethoxysilyl) octane, parabis(trimethoxysilylethyl) benzene, parabis(trimethoxysilylmethyl) benzene, 3-methoxypropyltrimethoxysilane, 2-[methoxy (polyethyleneoxy) propyl] trimethoxysilane, methoxytriethyleneoxypropyl trimethoxysilane, tris(3-trimethoxysilylpropyl) isocyanurate, [hydroxy (polyethyleneoxy) propyl] triethoxysilane, N,N'-bis(hydroxyethyl)-N,N'-bis (trimethoxysilylpropyl) ethylenediamine, bis-[3-(triethoxysilylpropyl)-2-hydroxypropoxy] polyethylene oxide, bis [N,N'-(triethoxysilylpropyl) aminocarbonyl] polyethylene oxide, and bis(triethoxysilylpropyl) polyethylene oxide. Among these, methyltrimethoxysilane, ethyltrimethoxysilane, methyltriethoxysilane, ethyltriethoxysilane, and 3-glycidoxypropyltrimethoxysilane are particularly preferable, from a viewpoint of ease of availability and a viewpoint of adhesiveness with a hydrophilic layer.

In a case where $M^1$ is Ti in the organoalkoxide compound having a partial structure represented by General Formula 3, examples of bifunctional organoalkoxy titanate include dimethyl dimethoxy titanate, diethyl dimethoxy titanate, propyl methyl dimethoxy titanate, dimethyl diethoxy titanate, diethyl diethoxy titanate, dipropyl diethoxy titanate, phenylethyl diethoxy titanate, phenylmethyl dipropoxy titanate, and dimethyl dipropoxy titanate.

In a case where $M^1$ is Ti in the organoalkoxide compound having a partial structure represented by General Formula 2, examples of trifunctional organoalkoxy titanate include methyl trimethoxy titanate, ethyl trimethoxy titanate, propyl trimethoxy titanate, methyl triethoxy titanate, ethyl triethoxy titanate, propyl triethoxy titanate, chloromethyl triethoxy titanate, phenyl trimethoxy titanate, phenyl triethoxy titanate, and phenyl tripropoxy titanate.

In a case where $M^1$ is Zr in the organoalkoxide compound having a partial structure represented by General Formula 2 or 3, examples of bifunctional and trifunctional organoalkoxy zirconate include organoalkoxy zirconate obtained by changing Ti with Zr in the compound exemplified as the bifunctional and trifunctional organo alkoxy titanate.

In a case where $M^1$ is Al in the organoalkoxide compound having a partial structure represented by General Formula 2 or General Formula 3, examples of bifunctional and trifunctional organoalkoxy aluminate include organoalkoxy aluminate obtained by changing Ti with Al in the compound exemplified as the bifunctional and trifunctional organoalkoxy titanate.

A ratio of the alkoxide compound which is an element having a partial structure represented by General Formula 1 and selected from the group consisting of Si, Ti, Zr, and Al, the alkoxide compound which is an element having a partial structure represented by General Formula 2 and selected from the group consisting of Si, Ti, Zr, and Al, and the alkoxide compound which is an element having a partial structure represented by General Formula 3 and selected from the group consisting of Si, Ti, Zr, and Al, used in a case of obtaining the sol-gel hardened material, is preferably controlled so that heat insulating properties are increased.

Specifically, the proportion of the alkoxide compound having a partial structure represented by General Formula 1 with respect to the alkoxide compound having a partial structure represented by General Formula 2 or 3 (including a metal coupling agent including a functional group capable of interacting with fibrous silver particles), at the time of preparing the sol-gel hardened material, is preferably 0.01 to 100 times, more preferably 0.02 to 80 times, particularly preferably 0.05 to 50 times, and more particularly preferably 0.1 to 40 times. A preferable range of the proportion of the partial structure represented by General Formula 1 of the sol-gel hardened material with respect to the partial structure represented by General Formula 2 or 3 is also the same as the preferable range of the proportion of the alkoxide compound having the partial structure represented by General Formula 1 with respect to the alkoxide compound having a partial structure represented by General Formula 2 or 3 (including a metal coupling agent including a functional group capable of interacting with fibrous silver particles).

These tetraalkoxide compound and organoalkoxide compound (including a metal coupling agent including a functional group capable of interacting with fibrous silver particles) are easily available as a commercially available product, and are also obtained by a well-known synthesis method, for example, a reaction between various metal halides and alcohol.

As the tetraalkoxide compound and organoalkoxide compound, one kind of the compounds may be used alone or a combination of two or more kinds of the compounds may be used.

Particularly preferable examples of tetraalkoxide compound include tetramethoxysilane, tetraethoxysilane, tetrapropoxy titanate, tetraisopropoxy titanate, tetraethoxy zirconate, and tetrapropoxy zirconate. In addition, particularly preferable examples of organoalkoxide compound include methyltrimethoxysilane, dimethyldiethoxysilane, 3-glycidoxypropyltrimethoxysilane, 2-(3,4-epoxycyclohexyl) ethyltrimethoxysilane, ureidopropyltriethoxysilane, diethyldimethoxysilane, propyltriethoxy titanate, and ethyl triethoxy zirconate.

The fibrous silver particles-containing layer preferably satisfies at least one of the following condition (i) or (ii), and particularly preferably satisfies the following conditions (i) and (ii). (i) A ratio of substance quantity of the element (b) contained in the fibrous silver particles-containing layer to substance quantity of the metal element (a) contained in the fibrous silver particles contained in the fibrous silver particles-containing layer [(molar number of element (b))/(molar number of silver element (a))] is in a range of 0.10/1 to 22/1.

(ii) A ratio of a mass of the alkoxide compound used for forming the sol-gel hardened material in the fibrous silver particles-containing layer to a mass of fibrous silver particles contained in the fibrous silver particles-containing layer [(content of alkoxide compound)/(content of fibrous silver particles)] is in a range of 0.25/1 to 30/1.

It is preferable that the fibrous silver particles-containing layer is formed so that a ratio of a usage amount of a specified alkoxide compound with respect to a usage amount of silver nanowires, that is, a ratio of [(mass of specified alkoxide compound)/(mass of fibrous silver particles)] is in a range of 0.25/1 to 30/1. In a case where the mass ratio is equal to or greater than 0.25/1, it is possible to obtain a fibrous silver particles-containing layer having excellent heat insulating properties (this may be due to high conductivity of the fibrous silver particles) and transparency, and excellent abrasion resistance, heat resistance, moist heat resistance, and bending resistance. In a case where the mass ratio is equal to or smaller than 30/1, it is possible to obtain a fibrous silver particles-containing layer having excellent bending resistance.

The mass ratio is more preferably in a range of 0.5/1 to 25/1, even more preferably in a range of 1/1 to 20/1, and most preferably in a range of 2/1 to 15/1. By setting the mass ratio to be in the preferable range, the fibrous silver particles-containing layer obtained has high heat insulating properties and high transparency (visible light transmittance and haze), and excellent abrasion resistance, heat resistance, moist heat resistance, and bending resistance, and accordingly, it is possible to stably obtain a far infrared reflective film having suitable physical properties.

As an optimal aspect, in the fibrous silver particles-containing layer, the ratio of substance quantity of the element (b) to substance quantity of the metal element (a) [(molar number of element (b))/(molar number of metal element (a))] is in a range of 0.10/1 to 22/1. The molar ratio is more preferably 0.20/1 to 18/1, particularly preferably 0.45/1 to 15/1, more particularly preferably 0.90/1 to 11/1, and even more particularly preferably 1.5/1 to 10/1.

In a case where the molar ratio is in the range described above, the fibrous silver particles-containing layer has both of heat insulating properties and transparency, and has excellent abrasion resistance, heat resistance, moist heat resistance, and bending resistance, from a viewpoint of physical properties.

The specified alkoxide compound used when forming the fibrous silver particles-containing layer is used up due to hydrolysis and polycondensation and substantially no alkoxide compound is present in the fibrous silver particles-containing layer, but the fibrous silver particles-containing layer obtained contains the element (b) such as Si or the like derived from the specified alkoxide compound. By adjusting the ratio of the substance quantity of the element (b) such as Si contained to the metal element (a) derived from the fibrous silver nanowires, the fibrous silver particles-containing layer having excellent properties is formed.

A component of the element (b) selected from the group consisting of Si, Ti, Zr, and Al derived from the specified alkoxide compound of the fibrous silver particles-containing layer and a component of the silver element (a) derived from the fibrous silver particles can be analyzed by the following method.

That is, the ratio of the substance quantity, that is, the value of (component molar number of element (b))/(component molar number of silver element (a)) can be calculated by performing X ray photoelectron analysis (Electron Spectroscopy FOR Chemical Analysis (ESCA)) with respect to the fibrous silver particles-containing layer. However, since measurement sensitivity is different depending on an element in the analysis method using ESCA, a value obtained does not necessarily directly show a molar ratio of the element components. Accordingly, a calibration curve is drawn by using a fibrous silver particles-containing layer having a well-known molar ratio of element components in advance, and a ratio of substance quantity of the actual fibrous silver particles-containing layer can be calculated from the calibration curve. As the molar ratio of each element in this specification, a value calculated by using the following method is used.

The far infrared reflective film preferably exhibits effects of obtaining high heat insulating properties and transparency and excellent abrasion resistance, heat resistance, moist heat resistance, and bending resistance. The reason of exhibiting such effects is not clear, but the following reasons are assumed.

That is, since the fibrous silver particles-containing layer contains fibrous silver particles and a matrix which is a sol-gel hardened material obtained by hydrolysis and polycondensation of the specified alkoxide compound, a dense fibrous silver particles-containing layer having less voids and high crosslinking density is formed, even in a case where the percentage of the matrix contained in the fibrous silver particles-containing layer is small, compared to a case of a fibrous silver particles-containing layer containing a general organic polymer resin (for example, an acrylic resin, a vinyl polymerization resin, or the like) as a matrix, and accordingly, a far infrared reflective film having excellent abrasion resistance, heat resistance, and moist heat resistance is obtained. It is assumed that, by satisfying any one of setting the content molar ratio of the element (b) derived from the specified alkoxide compound/silver element (a) derived from fibrous silver particles to be in a range of 0.10/1 to 22/1 and setting the mass ratio of the specified alkoxide compound/silver element to be in a range of 0.10/1 to 22/1, the operation is improved with good balance, heat insulating properties and transparency are maintained, and excellent abrasion resistance, heat resistance, and moist heat resistance, and excellent bending resistance are exhibited.

The fibrous silver particles-containing layer may include the sol-gel hardened material as a matrix or may include the sol-gel hardened material as a binder. Here, a "matrix" is a general term of substances forming a layer including fibrous silver particles such as silver nanowires. By containing a matrix, a dispersion state of fibrous silver particles such as silver nanowires of the fibrous silver particles-containing layer is stably maintained, and even in a case where the fibrous silver particles-containing layer is formed on the surface of the support without using the adhesive layers, strong adhesion between the support and the fibrous silver particles-containing layer tends to be ensured.

(Other Matrix)

The sol-gel hardened material contained in the fibrous silver particles-containing layer has a function as a matrix, but the fibrous silver particles-containing layer may further contain matrix other than the sol-gel hardened material (hereinafter, referred to as other matrix). The fibrous silver particles-containing layer containing other matrix contains a material capable of forming other matrix in a dispersion for forming a far infrared reflective film which will be described later, and may be formed by applying this on the support.

The other matrix may be nonphotosensitive such as an organic polymer or may be photosensitive such as a photoresist composition.

In a case where the fibrous silver particles-containing layer contains other matrix, the content thereof is 0.10% by mass to 20% by mass, preferably 0.15% by mass to 10% by mass, and even more preferably 0.20% by mass to 5% by mass, with respect to the content of the sol-gel hardened material derived from the specified alkoxide compound contained in the fibrous silver particles-containing layer, because a fibrous silver particles-containing layer having excellent heat insulating properties, transparency, film hardness, abrasion resistance, and bending resistance is obtained.

—Organic Polymer—

The preferable nonphotosensitive matrix contains an organic polymer. Specific examples of the organic polymer include polyacrylic acid such as polymethacrylic acid, polymethacrylate (for example, poly (methyl methacrylate)), polyacrylate, or polyacrylonitrile, a highly aromatic polymer such as polyvinyl alcohol, polyesters (e.g., polyethylene terephthalate (PET), polyester naphthalate, and polycarbonate), phenol or cresol formaldehyde (Novolacs (registered trademark)), polystyrene, polyvinyl toluene, polyvinyl xylene, polyimide, polyamide, polyamideimide, polyetherimide, polysulfide, polysulfone, polyphenylene, or polyphenylether, polyurethane, epoxy, polyolefin (e.g., polypropylene, polymethylpentene, and cyclic olefins), acrylonitrile-butadiene-styrene copolymer, cellulose, silicone, and other silicon-containing polymer (for example, polysilsesquioxane and polysilane), polyvinyl chloride, polyvinyl acetate, polynorbornene, synthetic rubber, (for example, ethylene propylene rubber (EPR), styrene butadiene rubber (SBR), ethylene propylene diene monomer (EPDM) rubber), and a fuorocarbon-based polymer (for example, polyvinylidene fluoride, polytetrafluoroethylene, or polyhexafluoropropylene), a fluoro-olefin copolymer, hydrocarbon olefin (for example, "LUMIFLON" (registered trademark) manufactured by Asahi Glass Co., Ltd.), an amorphous fluorocarbon polymer or copolymer (for example, "CYTOP" (registered trademark) manufactured by Asahi Glass Co., Ltd., and "Teflon" (registered trademark) AF manufactured by Dupont), and there is no limitation.

—Crosslinking Agent—

A crosslinking agent is a compound which forms a chemical bond by free radicals or acids and heat and hardens a fibrous silver particles-containing layer, and examples thereof include a melamine-based compound substituted with at least one selected from a methylol group, an alkoxymethyl group, and an acyloxymethyl group, a guanamine-based compound, a glycoluril-based compound, a urea-based compound, a phenol-based compound or an ether compound of phenol, an epoxy-based compound, an oxetane-based compound, a thioepoxy-based compound, an isocyanate-based compound, or an amide-based compound, and a compound having an ethylenically unsaturated group containing a methacryloyl group or an acryloyl group. Among these, an epoxy-based compound, an oxetane-based compound, and a compound having an ethylenically unsaturated group are particularly preferable, from viewpoints of film properties, heat resistance, and solvent resistance.

An oxetane-based compound can be used alone or in a mixture with an epoxy resin. Particularly, it is preferable to use an oxetane-based compound together with an epoxy resin, from viewpoints of high reactivity and improvement of film properties.

When the total mass of a solid content of the dispersion for forming a far infrared reflective film including fibrous silver particles such as silver nanowires described above is 100 parts by mass, the content of the crosslinking agent in the fibrous silver particles-containing layer is preferably 1 part by mass to 250 parts by mass and more preferably 3 parts by mass to 200 parts by mass.

—Dispersing Agent—

A dispersing agent is used for dispersing the fibrous silver particles such as silver nanowires in the dispersion for forming the far infrared reflective film while preventing aggregation thereof. The dispersing agent is not particularly limited as long as it can disperse the silver nanowires and can be suitably selected according to the purpose. For example, a dispersing agent which is commercially available as a pigment dispersing agent can be used, and it is preferable to use particularly a polymer dispersing agent having properties of being adsorbed to silver nanowires. Examples of such a polymer dispersing agent include polyvinylpyrrolidone, BYK SERIES (registered trademark, manufactured by BYK Additives & Instruments), SOLSPERSE SERIES (registered trademark, manufactured by The Lubrizol Corporation), and AJISPER SERIES (registered trademark, manufactured by Ajinomoto Co., Inc.).

The content of the dispersing agent in the fibrous silver particles-containing layer is preferably 0.1 parts by mass to 50 parts by mass, more preferably 0.5 parts by mass to 40 parts by mass, and particularly preferably 1 part by mass to 30 parts by mass, with respect to 100 parts by mass of a binder in a case of using particularly a binder disclosed in paragraphs [0089] to [0095] of JP2013-225461A.

By setting the content of the dispersing agent with respect to the binder to be equal to or greater than 0.1 parts by mass, aggregation of the fibrous silver particles such as silver nanowires in a dispersion is effectively prevented, and by setting the content thereof to be equal to or smaller than 50 parts by mass, a stable liquid film is formed in a coating step and generation of coating unevenness is prevented, and thus, the ranges described above are preferable.

—Solvent—

A solvent a coating solution for forming a far infrared reflective film for forming a dispersion for forming the far infrared reflective film including the fibrous silver particles such as silver nanowires and the specified alkoxide compound (composition for forming the fibrous silver particles-containing layer) on the surface of the support, a surface of an adhesive layer of an adhesive layer-attached support, or the surface of the interlayer including the compound including the functional group capable of interacting with the fibrous silver particles of the interlayer-attached support including the compound including the functional group capable of interacting with the fibrous silver particles, to have a film shape, and can be suitably selected according to the purpose. The dispersion for forming the far infrared reflective film may include at least one of water and an organic solvent as a solvent, if necessary. By including the organic solvent, a more uniform liquid film can be formed on the support. Examples of the solvent include propylene glycol monomethyl ether, propylene glycol monomethyl ether acetate, ethyl 3-ethoxypropionate, methyl 3-methoxypropionate, ethyl lactate, 3-methoxy butanol, water, 1-methoxy-2-propanol, isopropyl acetate, methyl lactate, N-methylpyrrolidone, γ-butyrolactone, and propylene carbonate. Examples of other organic solution include a ketone-based solvent such as acetone, methyl ethyl ketone, or diethyl ketone, an alcohol-based solvent such as methanol, ethanol, 2-propanol, 1-propanol, 1-butanol, or tert-butanol, a chlorine-based solvent such as chloroform or methylene chloride, an aromatic solvent such as benzene or toluene, an ester-based solvent such as ethyl acetate, butyl acetate, or isopropyl acetate, an ether-based solvent such as diethyl ether, tetrahydrofuran, or dioxane, and a glycol ether-based solvent such as ethylene glycol monomethyl ether or ethylene glycol dimethyl ether. This solvent may serve as at least some of the solvent of the dispersion of the silver nanowires described above. These may be used alone or in combination of two or more kinds thereof.

A concentration of solid contents of the coating solution, for forming the far infrared reflective film, containing the solvent is preferably in a range of 0.1% by mass to 20% by mass.

In a case where the dispersion for forming the far infrared reflective film includes the organic solvent, the content thereof is preferably in a range of equal to or smaller than 50% by mass and more preferably in a range of equal to or smaller than 30% by mass, with respect to the total mass of the dispersion for forming the far infrared reflective film.

—Metal Corrosion Inhibitor—

The fibrous silver particles-containing layer preferably contains a metal corrosion inhibitor of the fibrous silver particles such as silver nanowires. The metal corrosion inhibitor is not particularly limited and can be suitably selected according to the purposes. Thiols or azoles are suitable, for example.

By including the metal corrosion inhibitor, it is possible to exhibit an antirust effect and to prevent a decrease in heat insulating properties and transparency of the fibrous silver particles-containing layer over time. The metal corrosion inhibitor can be applied by being added into a dispersion for forming the far infrared reflective film in a state of being suitably dissolved with a solvent or in a state of powder, or manufacturing a fibrous silver particles-containing layer using a dispersion (preferably a coating solution) for forming the far infrared reflective film which will be described later, and then dipping the fibrous silver particles-containing layer in a metal corrosion inhibitor bath.

In a case of adding the metal corrosion inhibitor, the content thereof in the fibrous silver particles-containing layer is preferably 0.5% by mass to 10% by mass with respect to the content of the fibrous silver particles such as silver nanowires.

As the other matrix, the polymer compound of the dispersing agent used in a case of preparing the fibrous silver particles such as silver nanowires described above can be used as at least a part of components configuring the matrix.

—Other Conductive Material—

The fibrous silver particles-containing layer may include other conductive materials, for example, conductive particles, in addition to the fibrous silver particles such as silver nanowires, within a range not degrading the effects of the invention. From a viewpoint of the effect, a content of the fibrous silver particles such as silver nanowires (preferably, silver nanowires having an aspect ratio equal to or greater than 10) is preferably equal to or greater than 50%, more preferably equal to or greater than 60%, and particularly preferably equal to or greater than 75%, based on volume, with respect to the total amount of the conductive material containing the fibrous silver particles such as silver nanowires.

The conductive particles other than the fibrous silver particles such as silver nanowires may not significantly contribute to conductivity of the fibrous silver particles-containing layer and may have absorption in a visible light region. It is particularly preferable that the conductive particles are metal and do not have a shape with strong plasmon absorption such as a spherical shape, from a viewpoint of not deteriorating transparency of the fibrous silver particles-containing layer.

Here, a percentage of the fibrous silver particles such as silver nanowires can be acquired as follows. For example, in a case where the fibrous silver particles are silver nanowires and the conductive particles are silver particles, a silver nanowires aqueous dispersion is filtered to separate silver nanowires and other conductive particles, each of an amount of silver remaining on the filter paper and an amount of silver transmitted through the filter paper are measured by using an inductively coupled plasma (ICP) emission analysis device, and the percentage of the silver nanowires can be calculated. The aspect ratio of the fibrous silver particles such as silver nanowires is calculated by observing the fibrous silver particles such as silver nanowires remaining on the filter paper using a TEM and measuring each of short axis lengths and long axis lengths of the fibrous silver particles such as 300 silver nanowires.

The measurement method of the average long axis length and the average short axis length of the fibrous silver particles such as silver nanowires are as described above.

<Interlayer>

It is preferable that the far infrared reflective film includes at least one interlayer between the support and the fibrous silver particles-containing layer. By providing the interlayer between the support and the fibrous silver particles-containing layer, at least one of adhesiveness between the support and the fibrous silver particles-containing layer, entire light transmittance of the fibrous silver particles-containing layer, the haze of the fibrous silver particles-containing layer, or film hardness of the fibrous silver particles-containing layer can be improved.

As the interlayer, an adhesive layer for improving adhesiveness between the support and the fibrous silver particles-containing layer or a functional layer for improving functionality with interaction with a component contained in the fibrous silver particles-containing layer is used, and the interlayer is suitably selected according to the purpose.

A configuration of the far infrared reflective film including the interlayer will be described with reference to the drawing.

In FIG. 1, the fibrous silver particles-containing layer 20 is provided on the adhesive layer-attached support 101 which is formed by providing the interlayer (first adhesive layer 31 and second adhesive layer 32) on the support. The interlayer including the first adhesive layer 31 having excellent affinity with the support 10 and the second adhesive layer 32 having excellent affinity with fibrous silver particles-containing layer 20 is provided between the support 10 and the fibrous silver particles-containing layer 20.

An interlayer having a configuration other than that of FIG. 1 may be provided, and for example, it is also preferable that an interlayer including a functional layer adjacent to the fibrous silver particles-containing layer 20 is provided between the support 10 and the fibrous silver particles-containing layer 20, in addition to the first adhesive layer 31 and the second adhesive layer 32 which are the same as those in the first embodiment (not shown).

A material used for the interlayer is not particularly limited and materials for improving at least any one of the properties described above may be used.

For example, in a case of including the adhesive layer as the interlayer, materials selected from a polymer used in an adhesive, a silane coupling agent, a titanium coupling agent, and a sol-gel film obtained by allowing hydrolysis and polycondensation of the alkoxide compound of Si are contained in the adhesive layer.

Figure 3:
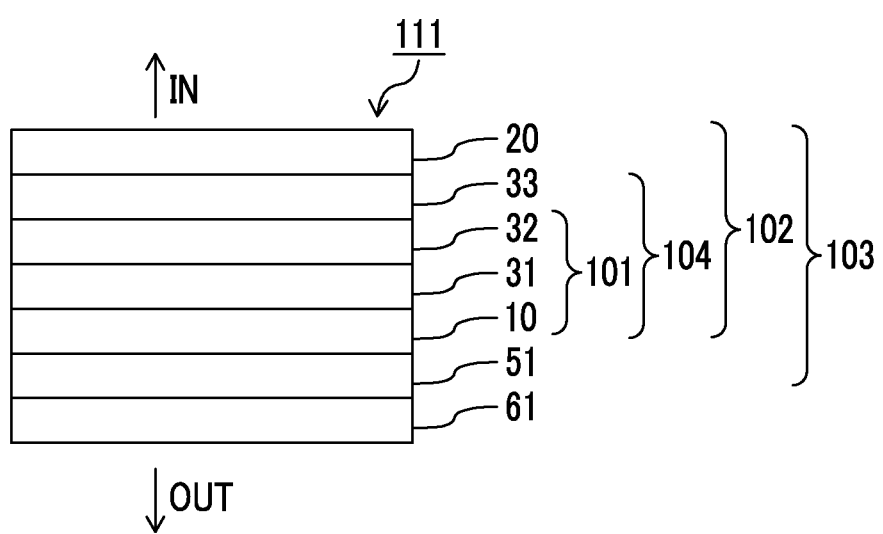
FIG. 3 is a schematic view showing a cross section of still another example of the far infrared reflective glass of the invention.

It is preferable that the interlayer adjacent to the fibrous silver particles-containing layer (that is, in a case where the interlayer is a single layer, the interlayer adjacent to the fibrous silver particles-containing layer, and in a case where the interlayer includes a plurality of sub-interlayers, the sub-interlayer adjacent to the fibrous silver particles-containing layer) is a functional layer including a compound including a functional group (hereinafter, referred to as "interaction-capable functional group") capable of interacting with fibrous silver particles such as silver nanowires included in the fibrous silver particles-containing layer 20, because a fibrous silver particles-containing layer having excellent entire light transmittance, haze, and film hardness is obtained. That is, as shown in FIG. 3, the far infrared reflective film of the invention includes an interlayer 33 including a compound including a functional group capable of interacting with fibrous silver particles, between the support 10 and the fibrous silver particles-containing layer 20, and the interlayer 33 including a compound including a functional group capable of interacting with fibrous silver particles is preferably directly in contact with the fibrous silver particles-containing layer 20. In this case, the fibrous silver particles-containing layer 20 is preferably disposed on an interlayer-attached support 104 including a compound including a functional group capable of interacting with fibrous silver particles.

In a case of including the interlayer 33 including the compound including the functional group capable of interacting with the fibrous silver particles, a fibrous silver particles-containing layer having excellent film hardness is obtained.

Although the reason is not clear, by providing the interlayer including a compound including the interaction-capable functional group with the fibrous silver particles such as silver nanowires contained in the fibrous silver particles-containing layer 20, aggregation of the materials of the fibrous silver particles-containing layer is prevented, even dispersibility is improved, a decrease in transparency or haze caused by the aggregation of the fibrous silver particles in the fibrous silver particles-containing layer is prevented, and the improvement of film hardness due to adhesiveness is achieved, due to the interaction between the fibrous silver particles such as silver nanowires contained in the fibrous silver particles-containing layer and the compound including functional group described above contained in the interlayer. The interlayer which can exhibit such interaction may be referred to as a functional layer. The functional layer exhibits the effects described above by allowing the interaction with the fibrous silver particles such as silver nanowires. Accordingly, in a case where the fibrous silver particles-containing layer contains the fibrous silver particles such as silver nanowires, the effects described above are realized without depending on the matrix contained in the fibrous silver particles-containing layer.

In a case where the fibrous silver particles such as silver nanowires are silver nanowires, for example, examples of the interaction-capable functional group with the fibrous silver particles such as silver nanowires include an amide group, an amino group, a mercapto group, a phosphoric acid group, a phosphonic acid group, an isocyanate, group, a carboxylic acid group, a sulfonic acid group, or salt thereof, and a compound containing one or a plurality of functional groups selected from these is more preferable. As the functional group, an amino group, a mercapto group, a phosphoric acid group, and a phosphonic acid group or salt thereof are more preferable and an amino group is even more preferable.

The compound including the functional group capable of interacting with the fibrous silver particles which is used in the interlayer including the compound including the functional group capable of interacting with the fibrous silver particles may be the metal coupling agent including the functional group capable of interacting with the fibrous silver particles or may be a compound not including a central metal element or a hydrolysable group.

Examples of the compound including the functional group include compounds including an amide group such as ureidopropyltriethoxysilane, polyacrylamide, or polymethacrylamide, compounds including an amino group such as N-β(aminoethyl) γ-aminopropyltrimethoxysilane, 3-aminopropyltriethoxysilane, bis(hexamethylene)triamine, N,N'-bis(3-aminopropyl)-1,4-butanediamine tetrahydrochloride, spermine, diethylenetriamine, meta-xylenediamine, or meta-phenylene diamine, compounds including a mercapto group such as 3-mercaptopropyltrimethoxysilane, 2-mercaptobenzothiazole, or toluene-3,4-dithiol, compounds including a group of sulfonic acid or salt thereof such as poly(sodium para-styrene sulfonate), or poly(2-acrylamido-2-methylpropane sulfonate), compounds including a carboxylic acid group such as polyacrylic acid, polymethacrylic acid, polyaspartic acid, terephthalic acid, cinnamic acid, fumaric acid, or succinic acid, compounds including a phosphoric acid group such as PHOSMER PE, PHOSMER CL, PHOSMER M, and PHOSMER MH (product name, manufactured by Uni-Chemical Co., Ltd.) and polymers thereof, POLYPHOSMER M-101, POLYPHOSMER PE-201, and POLYPHOSMER MH-301 (product name, manufactured by DAP Co., Ltd.), and compounds including a phosphonic acid group such as phenylphosphonic acid, decylphosphonic acid, methylene diphosphonic acid, vinylphosphonic acid, or allylphosphonic acid.

By selecting these functional groups, aggregation of the fibrous silver particles such as silver nanowires is prevented in a case of applying a coating solution which is the dispersion for forming the far infrared reflective film and allowing interaction between the fibrous silver particles such as silver nanowires and the functional groups contained in the interlayer and drying, and a fibrous silver particles-containing layer in which the fibrous silver particles such as silver nanowires are uniformly dispersed can be formed.

The interlayer can be formed by applying liquid obtained by dissolving, dispersing, or emulsifying compounds configuring the interlayer on the support and drying the liquid, and general methods can be used as the application method. The method thereof is not particularly limited and can be suitably selected according to the purpose. Examples thereof include a roll coating method, a bar coating method, a dip coating method, a spin coating method, a casting method, a die coating method, a blade coating method, a gravure coating method, a curtain coating method, a spray coating method, and doctor coating method.

<Protective Layer>

Figure 2:
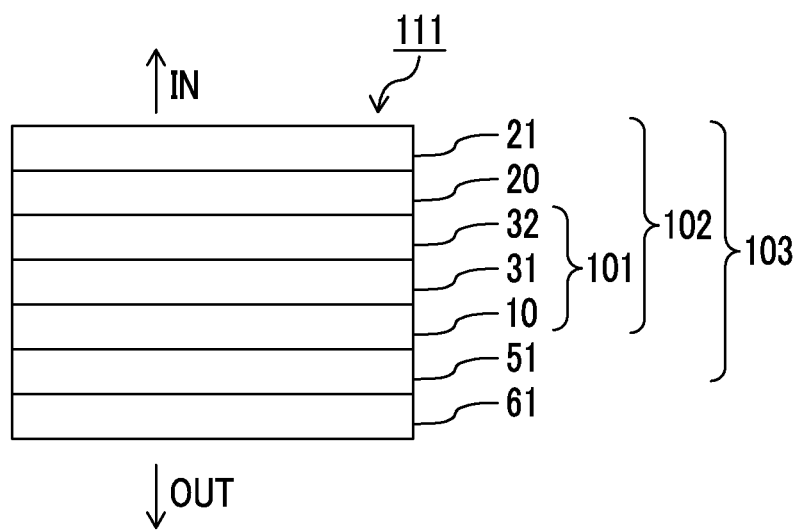
FIG. 2 is a schematic view showing a cross section of another example of the far infrared reflective glass of the invention.

As shown in FIG. 2, the far infrared reflective film may include or may not include a protective layer (reference numeral 21 in FIG. 2) on the fibrous silver particles-containing layer (reference numeral 20 in FIG. 2). The protective layer is not particularly limited and is preferably has excellent abrasion resistance. A film thickness of the protective layer is not particularly limited and is preferably equal to or smaller than 5 µm, more preferably equal to or smaller than 3 µm, and particularly preferably equal to or smaller than 1 µm.

The composition of the protective layer is not particularly limited, and cycloolefin polymer (COP), cycloolefin copolymer (COC), a sol-gel hardened material, and a silica sputter is preferable and a sol-gel hardened material is more preferable. As a material for forming a sol-gel hardened material used in a protective layer, a material for forming a sol-gel hardened material included in the fibrous silver particles-containing layer can be used.

<Pressure Sensitive Adhesive Layer>

The far infrared reflective film of the invention preferably includes a pressure sensitive adhesive layer. The pressure sensitive adhesive layer can contain an ultraviolet absorbing agent.

A material capable of being used for forming the pressure sensitive adhesive layer is not particularly limited and can be suitably selected according to the purpose. Examples thereof include a polyvinyl butyral resin, an acrylic resin, a styrene/acrylic resin, a urethane resin, a polyester resin, and silicone resin. These may be used alone or in combination of two or more kinds thereof. The pressure sensitive adhesive layer formed of these materials can be formed by coating.

In addition, an antistatic agent, a lubricant, or an anti-blocking agent may be added to the pressure sensitive adhesive layer.

A thickness of the pressure sensitive adhesive layer is preferably 0.1 µm to 10 µm.

[Dispersion for Forming Far Infrared Reflective Film]

The dispersion for forming the far infrared reflective film of the invention includes fibrous silver particles, the metal coupling agent including a functional group capable of interacting with the fibrous silver particles, and the alkoxide compound.

With such a configuration, the dispersion for forming the far infrared reflective film of the invention can provide a far infrared reflective film having excellent heat insulating properties, film hardness, and surface properties and excellent stability of the dispersion is obtained.

In one embodiment, the dispersion (sol-gel coating solution) for forming the far infrared reflective film may be prepared by preparing an aqueous dispersion of the fibrous silver particles such as silver nanowires and mixing this aqueous dispersion with a solution including the metal coupling agent including a functional group capable of interacting with fibrous silver particles, and the alkoxide compound.

In one embodiment, the dispersion for forming the far infrared reflective film may be prepared by respectively preparing a solution including the metal coupling agent including a functional group capable of interacting with fibrous silver particles and a solution including the alkoxide compound, heating these solutions to cause hydrolysis of at least some of the metal coupling agent including a functional group capable of interacting with fibrous silver particles and the alkoxide compound to be in a sol state, and mixing the solution in the sol state and the aqueous dispersion of the fibrous silver particles with each other.

In order to promote a sol-gel reaction, it is practically preferable to use an acid catalyst or a basic catalyst together, in the dispersion for forming the far infrared reflective film, in order to improve reaction efficiency.

<Stability of Dispersion>

A viscosity ratio of the dispersion for forming the far infrared reflective film before and after an elapse of 24 hours after the preparation of the dispersion is preferably less than 1.5, a viscosity ratio thereof before and after an elapse of 36 hours is more preferably less than 1.5, and a viscosity ratio thereof before and after an elapse of 48 hours is particularly preferably less than 1.5. In addition, the viscosity ratio of the dispersion for forming the far infrared reflective film before and after an elapse of 24 hours after the preparation of the dispersion is preferably less than 1.2, the viscosity ratio thereof before and after an elapse of 36 hours is more preferably less than 1.2, and the viscosity ratio thereof before and after an elapse of 48 hours is particularly preferably less than 1.2.

The dispersion for forming the far infrared reflective film is preferably used within 48 hours, more preferably used within 24 hours, and particularly preferably used within 12 hours, from the preparation of the dispersion.

[Manufacturing Method of Far Infrared Reflective Film]

The manufacturing method of a far infrared reflective film of the invention is a manufacturing method of a far infrared reflective film including: a step of applying a dispersion for forming a far infrared reflective film, including fibrous silver particles, a metal coupling agent including a functional group capable of interacting with the fibrous silver particles, and an alkoxide compound, onto a support; and a step of performing hydrolysis and polycondensation of the metal coupling agent and the alkoxide compound to obtain a sol-gel hardened material.

With such a configuration, it is possible to easily manufacture the far infrared reflective film of the invention.

<Step of Applying Composition for Forming Interlayer>

The manufacturing method of a far infrared reflective film of the invention preferably includes a step of applying a composition for forming an interlayer, including a compound including a functional group capable of interacting with the fibrous silver particles onto the support, before the step of applying the dispersion for forming a far infrared reflective film onto the support, and the dispersion for forming the far infrared reflective film is preferably applied onto the interlayer so that the fibrous silver particles-containing layer is in direct contact with the interlayer.

<Step of Applying Dispersion for Forming Far Infrared Reflective Film>

The manufacturing method of a far infrared reflective film of the invention includes a step of applying a dispersion for forming a far infrared reflective film, including fibrous silver particles, a metal coupling agent including a functional group capable of interacting with the fibrous silver particles, and an alkoxide compound, onto a support.

The dispersion for forming the far infrared reflective film is preferably applied onto the support within 48 hours, more preferably applied onto the support within 24 hours, and particularly preferably applied onto the support within 12 hours, from the preparation of the dispersion.

—Forming Method of Fibrous Silver Particles-Containing Layer—

The method of applying the fibrous silver particles-containing layer onto the support is not particularly limited. General coating methods can be used and any method can be suitably selected according to the purpose. Examples thereof include a roll coating method, a bar coating method, a dip coating method, a spin coating method, a casting method, a die coating method, a blade coating method, a gravure coating method, a curtain coating method, a spray coating method, and doctor coating method.

As a method of forming the fibrous silver particles-containing layer on the support, the fibrous silver particles-containing layer is preferably manufactured by a method at least containing: forming a liquid film by applying a dispersion for forming the far infrared reflective film onto the support; and forming a fibrous silver particles-containing layer by allowing a reaction such as hydrolysis and polycondensation of the metal coupling agent including a functional group capable of interacting with the fibrous silver particles and at least a part of the alkoxide compound in the liquid film (hereinafter, this reaction such as hydrolysis and polycondensation is also referred to as a "sol-gel reaction"). This method may or may not further include evaporating (drying) performed by heating water contained in the dispersion for forming the far infrared reflective film as a solvent, if necessary.

The manufacturing method of the far infrared reflective film of the invention includes a step of performing hydrolysis and polycondensation of the metal coupling agent and the alkoxide compound to obtain a sol-gel hardened material.

In the coating solution film of the dispersion for forming the far infrared reflective film formed on the support, a reaction such as hydrolysis and polycondensation of the metal coupling agent and the alkoxide compound occurs, and in order to promote this reaction, it is preferable that the coating solution film is heated and dried. A heating temperature for promoting the sol-gel reaction is suitably in a range of 30° C. to 200° C. and more preferably in a range of 50° C. to 180° C. The heating and drying time is preferably 10 seconds to 300 minutes and more preferably 1 minute to 120 minutes.

[Far Infrared Reflective Glass and Window]

The far infrared reflective glass of the invention is a far infrared reflective glass obtained by laminating the far infrared reflective film of the invention and a glass.

The window of the invention is a window including a transparent window support and the far infrared reflective film of the invention bonded to the transparent window support.

As the transparent window support, a transparent window support having a thickness equal to or greater than 0.5 mm is preferable, a transparent window support having a thickness equal to or greater than 1 mm is more preferable, and from a viewpoint of preventing thermal conduction due to the thickness of the transparent window support and increasing warmth, a transparent window support having a thickness equal to or greater than 2 mm is particularly preferable.

In general, a plate-shaped or a sheet-shaped material is used as the transparent window support.

Examples of the transparent window support include transparent glass such as white plate glass, blue plate glass, or silica-coated blue plate glass; a synthetic resin such as polycarbonate, polyether sulfone, polyester, an acrylic resin, a vinyl chloride resin, an aromatic polyamide resin, polyamide imide, or polyimide; metal such as aluminum, copper, nickel, or stainless steel; ceramic; and a silicon wafer used in a semiconductor substrate. Among these, the transparent window support is preferably glass or a resin plate and more preferably glass.

Components configuring glass or window glass are not particularly limited, and transparent glass such as white plate glass, blue plate glass, or silica-coated blue plate glass can be used as the glass or the window glass, for example.

The glass used in the invention preferably has a smooth surface and is preferably float glass.

In a case of acquiring visible light transmittance of the far infrared reflective glass of the invention, it is preferable to perform the measurement by bonding the far infrared reflective film of the invention to a blue plate glass having a thickness of 3 mm. As the blue plate glass having a thickness of 3 mm, a glass disclosed in JIS A 5759 is preferably used.

The far infrared reflective film of the invention is bonded to the inner side of the window, that is, the indoor side of the window glass.

In the far infrared reflective glass of the invention or the window of the invention, the fibrous silver particles-containing layer of the far infrared reflective film of the invention is disposed on the surface of the support on a side opposite to the surface of the window (glass). In the invention, the fibrous silver particles-containing layer is preferably the outermost layer or the second outermost layer on the indoor side, from a viewpoint of increasing heat insulating properties, and more preferably the outermost layer on the indoor side.

In a case of bonding the far infrared reflective film of the invention to the window glass, the far infrared reflective window film of the invention in which the pressure sensitive adhesive layer is provided by coating or laminating is prepared, an aqueous solution containing a surfactant (mainly anionic) is sprayed onto the surface of the window glass or the surface of the pressure sensitive adhesive layer of the far infrared reflective film of the invention in advance, and the far infrared reflective film of the invention may be installed on the window glass through the pressure sensitive adhesive layer. The pressure sensitive adhesiveness of the pressure sensitive adhesive layer decreases while moisture is evaporated, and accordingly, the position of the far infrared reflective film of the invention can be adjusted on the glass surface. After determining the bonding position of the far infrared reflective film of the invention to the window glass, the moisture remaining between the window glass and the far infrared reflective film of the invention is swept from the center to the edge of the glass by using a squeegee or the like, and accordingly, the far infrared reflective film of the invention can be fixed to the surface of the window glass. By doing so, the far infrared reflective film of the invention can be installed on the window glass.

<Building Material, Building, and Vehicles>

The usage of the far infrared reflective film, far infrared reflective glass, and the window of the invention is not particularly limited and can be suitably selected according to the purposes. For example, the far infrared reflective film, far infrared reflective glass, and the window are used for vehicles, for building materials or buildings, and for agriculture. Among these, the far infrared reflective film, far infrared reflective glass, and the window are preferably used in building materials, buildings, and vehicles, from a viewpoint of energy saving effects.

The building material is a building material including the far infrared reflective film of the invention or the far infrared reflective glass of the invention.

The building is a building including the far infrared reflective film of the invention, the far infrared reflective glass of the invention, the building material of the invention, or the window of the invention. Examples of the building include a house, an office building, and a warehouse.

The vehicle is a vehicle including the far infrared reflective film of the invention, the far infrared reflective glass of the invention, or the window of the invention. Examples of the vehicle include a car, a railway vehicle, and a ship.

EXAMPLES

Hereinafter, the embodiments of the invention will be described more specifically with reference to the examples and comparative examples. The materials, the usage amount, the ratio, the process content, and the process procedure shown in the following examples can be suitably changed within a range not departing from the gist of the invention. Therefore, the ranges of the invention are not narrowly interpreted based on the specific examples shown below. In addition, "%" and "parts" for describing the content in the examples are based on weight.

[Measurement Method]

In the examples below, the average short axis length (average diameter) and the average long axis length of the fibrous silver particles, the coefficient of variation of the short axis lengths of the fibrous silver particles, and the percentage of the fibrous silver particles having an aspect ratio equal to or greater than 10 were measured as follows.

<Average Short Axis Length (Average Diameter) and Average Long Axis Length of Fibrous Silver Particles>

Short axis lengths (diameters) and long axis lengths of 300 fibrous silver particles randomly selected from the fibrous silver particles which were enlarged and observed by using a transmission electron microscope (TEM; product name: JEM-2000FX manufactured by JEOL, Ltd.) were measured, and an average short axis length (average diameter) and an average long axis length of the fibrous silver particles were acquired from the average value thereof.

<Coefficient of Variation of Short Axis Lengths (Diameters) of Fibrous Silver Particles>

The short axis lengths (diameters) of 300 nanowires randomly selected from the transmission electron microscope (TEM) image were measured and a standard deviation and an average value of 300 nanowires were calculated to acquire a coefficient of variation. The coefficient of variation was acquired by dividing the value of the standard deviation by the average value.

<Percentage of Fibrous Silver Particles Having Aspect Ratio Equal to or Greater than 10>

The short axis lengths of 300 fibrous silver particles were observed by using a transmission electron microscope (JEM-2000FX: manufactured by JEOL, Ltd.) the amounts of silver transmitted filter paper were respectively measured, the fibrous silver particles having a short axis length equal to or smaller than 50 nm and a long axis length equal to or greater than 5 μm was acquired as a percentage (mass %) of the fibrous silver particles having an aspect ratio equal to or greater than 10.

The separation of the fibrous silver particles in a case of acquiring the percentage of the fibrous silver particles was performed by using a membrane filter (product name: FALP 02500, hole diameter: 1.0 μm, manufactured by Millipore).

Preparation Example 1

<Preparation of Fibrous Silver Particle Aqueous Dispersion (1)>

The following liquid additives A, G, and H were prepared in advance.

(Liquid Additive A)

5.1 g of silver nitrate powder was dissolved in 500 mL of pure water. After that, 1 mol/L of ammonia water was added thereto until a transparent material was obtained. Pure water was added so that the total amount of the mixture becomes 100 mL.

(Liquid Additive G)

1 g of glucose powder was dissolved in 280 mL of pure water to prepare a liquid additive G.

(Liquid Additive H)

4 g of hexadecyl-trimethylammoniumbromide powder was dissolved in 220 mL of pure water to prepare a liquid additive H.

Next, a fibrous silver particle aqueous dispersion (1) was prepared as follows.

410 mL of pure water was put into a three-necked flask, and 82.5 mL of the liquid additive H and 206 mL of the liquid additive G were added through a funnel while stirring the solution at 20° C. (first stage). 206 mL of the liquid additive A was added to this solution at a flow rate of 2.0 mL/min and a stirring rotation rate of 800 rpm (revolutions per minute) (second stage). After 10 minutes, 82.5 mL of the liquid additive H was added (third stage). Then, the internal temperature was increased to 73° C. at a rate of 3° C./min. After that, the stirring rotation rate was decreased to 200 rpm and the solution was heated for 1.5 hours.

After cooling the obtained aqueous dispersion, an ultrafiltration module SIP 1013 (product name, manufactured by Asahi Kasei Corporation, molecular weight cutoff: 6,000), a magnet pump, and a stainless steel cup were connected to each other through silicone tubes to prepare an ultrafiltration device.

The fibrous silver particle aqueous dispersion (aqueous solution) was put into the stainless steel cup and the pump was operated to perform ultrafiltration. 950 mL of distilled water was added into the stainless steel cup and washing was performed, when the amount of a filtrate from the module has become 50 mL. The washing described above was repeatedly performed until electric conductivity has become equal to or smaller than 50 µS/cm, and then, the concentration was performed to obtain 0.84% fibrous silver particle aqueous dispersion.

An average short axis length and an average long axis length of the fibrous silver particles included in the obtained fibrous silver particle aqueous dispersion, a coefficient of variation of short axis lengths of the fibrous silver particles, and a percentage of the fibrous silver particles having an aspect ratio equal to or greater than 10 were measured as described above.

As a result, fibrous silver particles having an average short axis length of 15.2 nm, an average long axis length of 7.9 µm, and a coefficient of variation of the short axis lengths of 17.8% were obtained. A percentage of the fibrous silver particles having an aspect ratio equal to or greater than 10 occupying the obtained fibrous silver particles is 81.8% by mass. Hereinafter, the "fibrous silver particle aqueous dispersion (1)" indicates the fibrous silver particle aqueous dispersion obtained by the method described above.

Preparation Example 2

<Preparation of PET Substrate (Adhesive Layer-Attached Support 101) Including Interlayer Having Configuration Shown in FIG. 3>

A solution for adhesion 1 was prepared with the following formulation.

(Solution for Adhesion 1)

TAKELAC (registered trademark) WS-4000: 5.0 parts by mass (polyurethane for coating, concentration of solid contents of 30% by mass, manufactured by Mitsui Chemicals)

Surfactant: 0.3 parts by mass (product name: NAROACTY HN-100 manufactured by Sanyo Chemical Industries)

Surfactant: 0.3 parts by mass (SANDET (registered trademark) BL, concentration of solid contents of 43% by mass, manufactured by Sanyo Chemical Industries)

Water: 94.4 parts by mass

Corona discharge treatment was performed with respect to one surface of a PET film (reference numeral 10 in FIG. 3) having a thickness of 50 µm used as a support, and the solution for adhesion 1 was applied to the surface subjected to the corona discharge treatment and dried at 120° C. for 2 minutes to form a first adhesive layer having a thickness of 0.11 µm (reference numeral 31 of FIG. 3).

A solution for adhesion 2 was prepared with the following formulation.

(Solution for Adhesion 2)

Tetraethoxysilane: 5.0 parts by mass (product name: KBE-04 manufactured by Shin-Etsu Chemical Co., Ltd.)

3-glycidoxypropyltrimethoxysilane: 3.2 parts by mass (product name: KBM-403 manufactured by Shin-Etsu Chemical Co., Ltd.)

2-(3,4-epoxycyclohexyl) ethyl trimethoxysilane: 1.8 parts by mass (product name: KBM-303 manufactured by Shin-Etsu Chemical Co., Ltd.)

Acetic acid aqueous solution (acetic acid concentration=0.05% by mass, power of Hydrogen ion concentration (pH)=5.2): 10.0 parts by mass Hardener: 0.8 parts by mass (boric acid manufactured by Wako Pure Chemical Industries, Ltd.)

Colloidal silica: 60.0 parts by mass (SNOWTEX (registered trademark) O, average particle diameter of 10 nm to 20 nm, concentration of solid contents of 20% by mass, pH=2.6, manufactured by Nissan Chemical Industries, Ltd.)

Surfactant: 0.2 parts by mass (NAROACTY HN-100 (described above))

Surfactant: 0.2 parts by mass (SANDET (registered trademark) BL, concentration of solid contents of 43% by mass, manufactured by Sanyo Chemical Industries)

Specifically, the solution for adhesion 2 was prepared by the following method. While vigorously stirring the acetic acid aqueous solution, 3-glycidoxypropyltrimethoxysilane was added dropwise into this acetic acid aqueous solution for 3 minutes. Next, 2-(3,4-epoxycyclohexyl) ethyl trimethoxysilane was added for 3 minutes while strongly stirring the acetic acid aqueous solution. Then, tetraethoxysilane was added for 5 minutes while strongly stirring the acetic acid aqueous solution, and stirring was continued for 2 hours. Next, colloidal silica, the hardener, and the surfactant were sequentially added to prepare the solution for adhesion 2.

The surface of the first adhesive layer (reference numeral 31 in FIG. 3) described above was subjected to corona discharge treatment, the solution for adhesion 2 described above was applied to this surface by a barcode method and heated and dried at 170° C. for 1 minute, and a second adhesive layer (reference numeral 32 in FIG. 3) having a thickness of 0.5 µm was formed to obtain an adhesive layer-attached support (PET substrate; reference numeral 101 in FIG. 3) having a configuration shown in FIG. 3.

Example 1

<Preparation of Solution for Interlayer Including Compound Including Functional Group Capable of Interacting with Fibrous Silver Particles>

It was confirmed that a uniform solution was obtained by performing dilution with the following composition, by using N-2-(aminoethyl)-3-aminopropyltrimethoxysilane as the compound including the functional group capable of interacting with the fibrous silver particles. The prepared solution was set as the solution for the interlayer including the compound including the functional group capable of interacting with the fibrous silver particles.

(Solution for Interlayer Including Compound Including Functional Group Capable of Interacting with Fibrous Silver Particles)

N-2-(aminoethyl)-3-aminopropyltrimethoxysilane (KBM 603 manufactured by Shin-Etsu Chemical Co., Ltd.): 0.3 parts by mass Distilled water: 99.7 parts by mass <Formation of Interlayer Including Compound Including Functional Group Capable of Interacting with Fibrous Silver Particles by Using Coating>

The solution for an interlayer including the compound including the functional group capable of interacting with the fibrous silver particles was bar-coated on a second adhesive layer (reference numeral 32 in FIG. 3) of the adhesive layer-attached support (PET substrate; reference numeral 101 in FIG. 3), so that the content of KBM 603 becomes 1.35 mg/m$^2$, and subjected to silane coupling treatment by warm air drying at 100° C. for 60 seconds, to form an interlayer (reference numeral 33 in FIG. 3) including the compound including the functional group capable of interacting with the fibrous silver particles. The amount of the solution for an interlayer including the compound including the functional group capable of interacting with the fibrous silver particles was adjusted so that a change in pH of the coating surface before and after the silane coupling treatment becomes +1.

The pH of the film surface was measured by adding 0.5 mL of pure water dropwise onto the film surface by using a pH electrode of GST-5423s manufactured by DKK-Toa Corporation, and a pH meter was measured.

The obtained support was set as an interlayer-attached support (reference numeral 104 in FIG. 3) including the compound including the functional group capable of interaction with the fibrous silver particles.

<Formation of Fibrous Silver Particles-Containing Layer by Using Coating>

It was confirmed that a uniform solution was obtained by performing dilution with the following composition, by using 3-mercaptopropylmethyldimethoxysilane, as the metal coupling agent including the functional group capable of interacting with the fibrous silver particles. The prepared solution was set as the solution for the metal coupling agent including the functional group capable of interacting with the fibrous silver particles.

(Solution for Metal Coupling Agent Including Functional Group Capable of Interacting with Fibrous Silver Particles)

Distilled water: 490.0 parts by mass
Hydrochloric acid (0.1 mol/L): 9.9 parts by mass
3-mercaptopropylmethyldimethoxysilane: 0.1 parts by mass
(KBM 802 manufactured by Shin-Etsu Chemical Co., Ltd.)

It was confirmed that a uniform solution was obtained by stirring a solution for the alkoxide compound having the following composition at 50° C. for 1 hour, by using tetraethoxysilane which is a compound satisfying General Formula 1, as the alkoxide compound. The prepared solution was set as the sol-gel solution.

(Solution of Alkoxide Compound)
Tetraethoxysilane: 15.0 parts by mass
(product name: KBE-04 (described above))
1 mass % acetic acid aqueous solution: 33.0 parts by mass
Distilled water: 12.0 parts by mass 2.35 parts by mass of the obtained solution for the metal coupling agent including the functional group capable of interacting with the fibrous silver particles, 7.2 parts by mass of the obtained sol-gel solution, and 14.25 parts by mass of the fibrous silver particle aqueous dispersion (1) obtained in Preparation Example 1 were mixed with each other and diluted using the distilled water to obtain a dispersion for forming a far infrared reflective film. The obtained dispersion for forming a far infrared reflective film was set as the dispersion for forming a far infrared reflective film of Example 1.

The dispersion for forming a far infrared reflective film was applied to the surface of the interlayer (reference numeral 33 in FIG. 3) including the compound including a functional group capable of interacting with the fibrous silver particles, of the interlayer-attached support (reference numeral 104 in FIG. 3) including the compound including a functional group capable of interacting with the fibrous silver particles, so that by using a bar coating method so that the silver amount is 0.040 g/m$^2$ and the total solid content coating amount is 0.840 g/m$^2$. After that, the dispersion was dried at 175° C. for 1 minute to allow a sol-gel reaction and a fibrous silver particles-containing layer (reference numeral 20 in FIG. 3) was formed. A mass ratio of the binder derived from the alkoxide compound/fibrous silver particles of the fibrous silver particles-containing layer was 20/1.

An average film thickness of the fibrous silver particles-containing layer measured by using an electron microscope as described below was 0.20 μm.

A protective layer formed of carbon and Pt was formed on the fibrous silver particles-containing layer. Then, a slice having a width of approximately 10 μm and a thickness of approximately 100 nm was prepared in a focusing ion beam device (product name: FB-2100) manufactured by Hitachi, Ltd., the cross section of the fibrous silver particles-containing layer was observed with a scanning transmission electron microscope (product name: HD-2300, applying voltage: 200 kV) manufactured by Hitachi, Ltd., film thicknesses of five portions of the fibrous silver particles-containing layer were measured, and an average film thickness was calculated as the arithmetic mean value thereof. The average film thickness was calculated by measuring only the thickness of the matrix portion not present in the fibrous silver particles.

<Formation of Pressure Sensitive Adhesive Layer and Preparation of Far Infrared Reflective Film>

A pressure sensitive adhesive material was bonded onto a surface of the interlayer-attached support (reference numeral 104 in FIG. 3) including the compound including the functional group capable of interacting with the fibrous silver particles, on a side opposite to the fibrous silver particles-containing layer, by the following method, to form a pressure sensitive adhesive layer (reference numeral 51 in FIG. 3). PANACLEAN PD-S 1 (pressure sensitive adhesive layer thickness of 25 μm) manufactured by PANAC Co., Ltd., was used as the pressure sensitive adhesive material, and a peelable separator (silicone coat PET) of the pressure sensitive adhesive material was peeled off and was bonded to the surface of the interlayer-attached support on a side opposite to the fibrous silver particles-containing layer.

The obtained laminate was set as a far infrared reflective film of Example 1.

<Preparation of Far Infrared Reflective Glass>

The other peelable separator (silicone coat PET) of the pressure sensitive adhesive material PD-S 1 was peeled off from the pressure sensitive adhesive layer formed by the method described above, the pressure sensitive adhesive layer was bonded to a plate glass (reference numeral 61 in FIG. 3, thickness of plate glass: blue plate glass having a thickness of 3 mm) which is soda-lime silicate by using a 0.5 mass % diluent of REAL PERFECT (manufactured by Lintec Corporation) which is film processing liquid, and a far infrared reflective glass (reference numeral 111 in FIG. 3) having a configuration shown in FIG. 3 was prepared. The obtained far infrared reflective glass was set as a far infrared reflective glass of Example 1.

Regarding the far infrared reflective glass of Example 1, the evaluation regarding properties was performed by methods which will be described later. As the plate glass, glass which is obtained by wiping dirt by isopropyl alcohol and naturally drying was used, and at the time of bonding, pressure welding was performed at a surface pressure of 0.5 kg/cm$^2$ by using a rubber roller in the environment of 25° C. and relative humidity of 65%.

Examples 2 to 4

Dispersions for forming a far infrared reflective film, far infrared reflective films, and far infrared reflective glasses of Examples 2 to 4 were prepared in the same manner as in Example 1, except that fibrous silver particle aqueous dispersion (1) used was changed so that the average long axis length of the fibrous silver particles becomes lengths shown in Table 1.

Examples 5 to 8

Dispersions for forming a far infrared reflective film, far infrared reflective films, and far infrared reflective glasses of Examples 5 to 8 were prepared in the same manner as in Example 1, except that the coating amount of the dispersion for forming a far infrared reflective film was changed so that the content of silver which is fibrous silver particles becomes content shown in Table 1.

Examples 9 to 12

Dispersions for forming a far infrared reflective film, far infrared reflective films, and far infrared reflective glasses of Examples 9 to 12 were prepared in the same manner as in Example 1, except that the amount of the alkoxide compound in the solution of the alkoxide compound was changed to the content of the alkoxide compound shown in Table 1.

Examples 13 to 16

Dispersions for forming a far infrared reflective film, far infrared reflective films, and far infrared reflective glasses of Examples 13 to 16 were prepared in the same manner as in Example 1, except that the content of the metal coupling agent was changed to the amount of the metal coupling agent shown in Table 2.

Examples 17 to 21

Dispersions for forming a far infrared reflective film, far infrared reflective films, and far infrared reflective glasses of Examples 17 to 21 were prepared in the same manner as in Example 1, except that the hydrochloric acid (0.1 mol/L) was replaced with distilled water in a case of preparing the solution for the metal coupling agent including the functional group capable of interacting with the fibrous silver particles, and the content or the kinds of the metal coupling agent was changed to the amount or the kinds shown in Table 2.

Example 22

A dispersion for forming a far infrared reflective film, a far infrared reflective film, and a far infrared reflective glass of Example 22 were prepared in the same manner as in Example 1, except that the interlayer including the compound including a functional group capable of interacting with the fibrous silver particles was not applied.

Comparative Example 1

In Example 1, a dispersion for forming a far infrared reflective film, a far infrared reflective film, and a far infrared reflective glass of Comparative Example 1 were prepared in the same manner as in Example 1, except that the kind of the metal coupling agent was changed to the kind of the metal coupling agent shown in Table 2.

Comparative Example 2

A dispersion for forming a far infrared reflective film, a far infrared reflective film, and a far infrared reflective glass of Comparative Example 2 were prepared in the same manner as in Example 1, except that the metal coupling agent was changed to distilled water.

Comparative Example 3

A dispersion for forming a far infrared reflective film, a far infrared reflective film, and a far infrared reflective glass of Comparative Example 3 were prepared in the same manner as in Example 1, except that the solution for the metal coupling agent including the functional group capable of interacting with the fibrous silver particles was changed to 1-(methylureidophenyl)-5-mercaptotetrazole (manufactured by Wako Pure Chemical Industries, Ltd., preparation of an alkaline aqueous solution having solid content of 0.02% by mass).

Comparative Example 4

A dispersion for forming a far infrared reflective film, a far infrared reflective film, and a far infrared reflective glass of Comparative Example 4 were prepared in the same manner as in a heat ray shielding film of Example 3 disclosed in JP2012-252172A, except that the coating thickness of the first heat ray reflecting layer was changed so that the content of silver which are fibrous silver particles of the first heat ray reflecting layer becomes 0.040 g/m$^2$, without changing the amount of a conductive polymer used in the second heat ray reflecting layer, unlike in Example 3 of JP2012-252172A.

Comparative Example 5

A dispersion for forming a far infrared reflective film and a far infrared reflective film of Comparative Example 5 were prepared in the same manner as in a non-pattern conductive member 1 of Example disclosed in JP2013-225460A. Then, a far infrared reflective glass of Comparative Example 5 was prepared in the same manner as in Example 1, except that the far infrared reflective film of Comparative Example 5 was used instead of the far infrared reflective film of Example 1.

[Evaluation]

(1) Heat Insulating Properties (Coefficient of Overall Heat Transmission)

Reflection spectra of far infrared reflective glass samples prepared in Examples and Comparative Examples were measured in a wavelength range of 5 μm to 25 μm by using a near infrared spectroscope IFS66v/S (manufactured by Bruker Optics K.K.). The coefficient of overall heat transmission was calculated based on JIS A 5759. The reflectivity at a wavelength of 25 μm to 50 μm was extrapolated from the reflectivity at 25 μm based on JIS A 5759.

<<Evaluation Standard>>

A: Coefficient of overall heat transmission is less than 4.3 W/m$^2$·K

B: Coefficient of overall heat transmission is equal to or greater than 4.3 W/m$^2$·K and less than 4.65 W/m$^2$·K C: Coefficient of overall heat transmission is equal to or greater than 4.65 W/m$^2$·K (2) Film Hardness Regarding the far infrared reflective glass samples prepared in Examples and Comparative Examples, the surface of the fibrous silver particles-containing layer was scratched over a length of 10 mm under the conditions of a load of 750 g, in a pencil scratch coating film hardness tester (product name: type NP manufactured by Toyo Seiki Seisaku-sho, Ltd.) in which pencils for Japan Paint Inspection and Testing Association verification pencil scratch (hardness HB and hardness B) were set based on ISO/Draft International Standard (DIS) 15184:1996, and then the following ranking was performed.

<<Evaluation Standard>>

AA: Excellent level in which, in a case of the scratch with a pencil having a hardness of 2H, the fibrous silver particles-containing layer is scraped and a scratch was recognized, but the fibrous silver particles-containing layer remains, and exposure of the surface of the support is not observed.

A: Good level in which, in a case of the scratch with a pencil having a hardness of 2H, exposure of the surface of the support is observed, but, in a case of the scratch with a pencil having hardness of H, the fibrous silver particles-containing layer remains, and exposure of the surface of the support is not observed.

B: Level in which, in a case of the scratch with a pencil having hardness of F, the fibrous silver particles-containing layer is scraped and exposure of the surface of the support is partially observed.

C: Level with significant problems, in which in a case of the scratch with a pencil having a hardness of HB, the fibrous silver particles-containing layer is scraped and most part of the surface of the support is exposed.

(3) Surface Properties

Regarding the far infrared reflective films prepared in Examples and Comparative Examples, the surface properties after 1 hour from the start of coating were visually determined based on the following points.

<<Evaluation Standard>>

AA: No recognizable streaks or cissing.

A: The number of recognizable streaks or cissing is less than 3 number/m$^2$.

B: The number of recognizable streaks or cissing is equal to or greater than 3 number/m$^2$ and less than 10 number/m$^2$.

C: The number of recognizable streaks or cissing is equal to or greater than 10 number/m$^2$.

(4) Stability of Dispersion

The dispersion (coating solution for forming fibrous silver particles-containing layer) for forming a far infrared reflective film of Examples and Comparative Examples was evaluated based on the following points. The viscosity of the dispersion for forming a far infrared reflective film was measured at a temperature of 25° C. by using SV-10 manufactured by A&D Company, Limited, and evaluated by using a rate of values measured before and after the elapse of time.

<<Evaluation Standard>>

A: A rate of viscosity before and after the elapse of 24 hours is less than 1.2.

B: A rate of viscosity before and after the elapse of 24 hours is equal to or greater than 1.2 and less than 1.5.

C: A rate of viscosity before and after the elapse of 24 hours is equal to or greater than 1.5.

Measurement results or evaluation results are shown in the following Table 1 and Table 2.

TABLE 1

| | Configuration of fibrous silver particles-containing layer ||||||||||| Results |||||
| | Fibrous silver particles || Metal coupling agent |||| Mass ratio with respect to fibrous silver particles | Alkoxide compound ||| Others | Interlayer including compound including functional group capable of interacting with fibrous silver particles | Heat insulating properties (Coefficient of overall heat transmission) | Film hardness | Surface properties | Preparation suitability ||
| | Content/ g·m⁻² | Average long axis length/ μm | Kinds | Functional group capable of interacting with fibrous silver particles | Functional group not capable of interacting with fibrous silver particles | Number of atom linking chains between functional group and central metal element of metal coupling agent | | Kinds | Content/ g·m⁻² | Metal element of alkoxide compound | | | | | | Surface properties | Stability of dispersion |
|---|---|---|---|---|---|---|---|---|---|---|---|---|---|---|---|---|---|
| Example 1 | 0.04 | 7.9 | 3-Mercaptopropylmethyl dimethoxysilane | Mercapto group | — | 3 | 0.001/1 | Tetraethoxysilane | 0.8 | Si | — | Present | A | A | AA | AA | A |
| Example 2 | 0.04 | 4.8 | 3-Mercaptopropylmethyl dimethoxysilane | Mercapto group | — | 3 | 0.001/1 | Tetraethoxysilane | 0.8 | Si | — | Present | B | A | AA | AA | A |
| Example 3 | 0.04 | 25.4 | 3-Mercaptopropylmethyl dimethoxysilane | Mercapto group | — | 3 | 0.001/1 | Tetraethoxysilane | 0.8 | Si | — | Present | A | A | A | A | A |
| Example 4 | 0.04 | 34.2 | 3-Mercaptopropylmethyl dimethoxysilane | Mercapto group | — | 3 | 0.001/1 | Tetraethoxysilane | 0.8 | Si | — | Present | B | A | A | A | B |
| Example 5 | 0.035 | 7.9 | 3-Mercaptopropylmethyl dimethoxysilane | Mercapto group | — | 3 | 0.001/1 | Tetraethoxysilane | 0.8 | Si | — | Present | A | A | AA | AA | A |
| Example 6 | 0.06 | 7.9 | 3-Mercaptopropylmethyl dimethoxysilane | Mercapto group | — | 3 | 0.001/1 | Tetraethoxysilane | 0.8 | Si | — | Present | A | A | AA | AA | A |
| Example 7 | 0.10 | 7.9 | 3-Mercaptopropylmethyl dimethoxysilane | Mercapto group | — | 3 | 0.001/1 | Tetraethoxysilane | 0.8 | Si | — | Present | A | A | AA | AA | A |
| Example 8 | 0.16 | 7.9 | 3-Mercaptopropylmethyl dimethoxysilane | Mercapto group | — | 3 | 0.001/1 | Tetraethoxysilane | 0.8 | Si | — | Present | A | B | A | A | B |
| Example 9 | 0.04 | 7.9 | 3-Mercaptopropylmethyl dimethoxysilane | Mercapto group | — | 3 | 0.001/1 | Tetraethoxysilane | 0.2 | Si | — | Present | A | B | AA | AA | A |
| Example 10 | 0.04 | 7.9 | 3-Mercaptopropylmethyl dimethoxysilane | Mercapto group | — | 3 | 0.001/1 | Tetraethoxysilane | 0.4 | Si | — | Present | A | A | AA | AA | A |
| Example 11 | 0.04 | 7.9 | 3-Mercaptopropylmethyl dimethoxysilane | Mercapto group | — | 3 | 0.001/1 | Tetraethoxysilane | 1.2 | Si | — | Present | A | A | AA | AA | A |
| Example 12 | 0.04 | 7.9 | 3-Mercaptopropylmethyl dimethoxysilane | Mercapto group | — | 3 | 0.001/1 | Tetraethoxysilane | 1.6 | Si | — | Present | B | AA | A | A | B |

TABLE 2

| | Configuration of fibrous silver particles-containing layer | | | | | | | | | | | Results | | | | |
|---|---|---|---|---|---|---|---|---|---|---|---|---|---|---|---|---|
| | Fibrous silver particles | | Metal coupling agent | | | | | Alkoxide compound | | | Others | Interlayer including compound including functional group capable of interacting with fibrous silver particles | Heat insulating properties (Coefficient of overall heat transmission) | Film hardness | Preparation suitability | |
| | Content/ g·m$^{-2}$ | Average long axis length/ μm | Kinds | Functional group capable of interacting with fibrous silver particles | Functional group not capable of interacting with fibrous silver particles | Number of atom linking chains between functional group and central metal element | Mass ratio with respect to fibrous silver particles | Kinds | Content/ g·m$^{-2}$ | Metal element of alkoxide compound | | | | | Surface properties | Stability of dispersion |
| Example 13 | 0.04 | 7.9 | 3-Mercaptopropylmethyldimethoxysilane | Mercapto group | — | 3 | 0.0004/1 | Tetraethoxysilane | 0.8 | Si | — | Present | A | A | A | B |
| Example 14 | 0.04 | 7.9 | 3-Mercaptopropylmethyldimethoxysilane | Mercapto group | — | 3 | 0.010/1 | Tetraethoxysilane | 0.8 | Si | — | Present | A | A | AA | A |
| Example 15 | 0.04 | 7.9 | 3-Mercaptopropylmethyldimethoxysilane | Mercapto group | — | 3 | 0.1/1 | Tetraethoxysilane | 0.8 | Si | — | Present | A | A | A | B |
| Example 16 | 0.04 | 7.9 | 3-Mercaptopropyltrimethoxysilane | Mercapto group | — | 3 | 0.001/1 | Tetraethoxysilane | 0.8 | Si | — | Present | A | A | AA | A |
| Example 17 | 0.04 | 7.9 | 3-Aminopropyltrimahoxysilane | Amino group | — | 3 | 0.001/1 | Tetraethoxysilane | 0.8 | Si | — | Present | A | A | AA | A |
| Example 18 | 0.04 | 7.9 | 3-Aminopropyltrimethoxysilane | Amino group | — | 3 | 0.005/1 | Tetraethoxysilane | 0.8 | Si | — | Present | A | A | AA | A |
| Example 19 | 0.04 | 7.9 | N-2-(aminoethyl)-3-aminopropyltrimethoxysilane | Amino group | — | 6 | 0.001/1 | Tetraethoxysilane | 0.8 | Si | — | Present | A | A | A | B |
| Example 20 | 0.04 | 7.9 | 3-Isocyanatepropyltriethoxysilane | Isocyanate group | — | 3 | 0.001/1 | Tetraethoxysilane | 0.8 | Si | — | Present | A | A | A | B |
| Example 21 | 0.04 | 7.9 | Ureidopropyltriethoxysilane | Ureido group | — | 5 | 0.001/1 | Tetraethoxysilane | 0.8 | Si | — | Present | B | A | B | B |
| Example 22 | 0.04 | 7.9 | 3-Mercaptopropylmethyldimethoxysilane | Mercapto group | — | 3 | 0.001/1 | Tetraethoxysilane | 0.8 | Si | — | Absent | A | A | B | A |
| Comparative Example 1 | 0.04 | 7.9 | Methyltrimethoxysilane | — | Methyl group | 0 | 0.001/1 | Tetraethoxysilane | 0.8 | Si | — | Present | A | A | C | C |
| Comparative Example 2 | 0.04 | 7.9 | — | — | — | — | — | Tetraethoxysilane | 0.8 | Si | — | Present | A | A | C | C |

TABLE 2-continued

| | Configuration of fibrous silver particles-containing layer | | | | | | | | | | Results | | | | |
|---|---|---|---|---|---|---|---|---|---|---|---|---|---|---|---|
| | Fibrous silver particles | | Metal coupling agent | | | | | Alkoxide compound | | | | Interlayer including compound including functional group capable of interacting with fibrous silver particles | Heat insulating properties (Coefficient of overall heat transmission) | | Preparation suitability | |
| | Content/ g·m⁻² | Average long axis length/ μm | Kinds | Functional group capable of interacting with fibrous silver particles | Functional group not capable of interacting with fibrous silver particles | Number of atom linking chains between functional group and central metal element | Mass ratio with respect to fibrous silver particles | Kinds | Content/ g·m⁻² | Metal element of alkoxide compound | Others | | | Film hardness | Surface properties | Stability of dispersion |
| Comparative Example 3 | 0.04 | 7.9 | — | — | — | — | — | Tetraethoxy-silane | 0.8 | Si | Mercapto compound | Present | A | A | C | C |
| Comparative Example 4 | 0.04 | 25.4 | — | — | — | — | — | — | — | — | Conductive polymer | Absent | B | C | A | A |
| Comparative Example 5 | 0.02 | 34.2 | 3-Glycidoxypropyl triethoxysilane | — | Glycidoxy-propyl group | 7 | 3.25/1 | Tetraethoxy-silane | 0.065 | Si | — | Absent | C | A | B | B |

From the results shown in Table 1 and Table 2, it was found that the far infrared reflective film of the invention has excellent heat insulating properties, film hardness, and surface properties. In addition, it was found that the dispersion for forming the far infrared reflective film of the invention can provide a far infrared reflective film having excellent heat insulating properties, film hardness, and surface properties, and excellent stability of the dispersion is obtained.

On the other hand, from Comparative Example 1, it was found that, in a case of using a metal coupling agent not including the functional group capable of interacting with fibrous silver particles, surface properties of the far infrared reflective film are deteriorated and stability of the dispersion for forming a far infrared reflective film are also deteriorated.

From Comparative Example 2, it was found that, in a case of not using the metal coupling agent including the functional group capable of interacting with fibrous silver particles, surface properties of the far infrared reflective film are deteriorated and stability of the dispersion for forming a far infrared reflective film are also deteriorated.

From Comparative Example 3, it was found that, in a case of using a mercapto compound including the functional group capable of interacting with fibrous silver particles, instead of using the metal coupling agent including the functional group capable of interacting with fibrous silver particles, surface properties of the far infrared reflective film are deteriorated and stability of the dispersion for forming a far infrared reflective film are also deteriorated.

It was found that film hardness of the far infrared reflective film of Comparative Example 4 in which the preparation was performed in the same manner as in Example 3 disclosed in JP2012-252172A and the sol-gel hardened material was not used in the fibrous silver particles-containing layer, was deteriorated.

It was found that heat insulating properties of the far infrared reflective film of Comparative Example 5 in which the metal coupling agent not including the functional group capable of interacting with fibrous silver particles was used and the amount of the metal coupling agent was adjusted with reference to a conductive member 1 disclosed in JP2013-225460A, were deteriorated.

In a case where the far infrared reflective film of Example 1 was bonded to a window of a building material, the consumption of an air conditioner was averagely decreased by 10% during the winter, compared to a case where the far infrared reflective film was not used. In addition, in a case where the far infrared reflective film of Example 1 was bonded to a window of a vehicle, the consumption of an air conditioner was averagely decreased by 15% during the winter.

INDUSTRIAL APPLICABILITY

The far infrared reflective glass of the invention obtained by using the far infrared reflective film of the invention has excellent heat insulating properties, film hardness, and surface properties, and therefore, in a case where the far infrared reflective film of the invention is disposed on the inner side of the window, it is possible to provide a window having excellent heat insulating properties, film hardness, and surface properties. By using the far infrared reflective film of the invention as a building material, it is possible to provide a building or a vehicle including windows having excellent heat insulating properties, film hardness, and surface properties. The building provided with such windows can allow light on the outdoor side of the window to emit the indoor side thereof and can prevent heat exchange from the indoor side to the outdoor side. Accordingly, the indoor side (the inside of a room or the inside of a vehicle) of a building or a vehicle provided with such windows can be maintained in a desired environment.

Even in a case where the far infrared reflective film of the invention is bonded to the inside of a well-known window (for example, window of a building or a vehicle), it is possible to provide a window having excellent heat insulating properties, film hardness, and surface properties.

EXPLANATION OF REFERENCES

10: support
20: fibrous silver particles-containing layer
21: protective layer
31: first adhesive layer
32: second adhesive layer
33: interlayer including compound including functional group capable of interacting with fibrous silver particles
51: pressure sensitive adhesive layer
61: glass
101: adhesive layer-attached support
102: heat insulating member
103: far infrared reflective film
104: interlayer-attached support including compound including functional group capable of interacting with fibrous silver particles
111: far infrared reflective glass
IN: indoor side
OUT: outdoor side

What is claimed is:

1. A far infrared reflective film comprising:
a support; and
a fibrous silver particles-containing layer provided on the support,
wherein the fibrous silver particles-containing layer includes fibrous silver particles, and a sol-gel hardened material obtained by hydrolysis and polycondensation of a metal coupling agent including a functional group capable of interacting with the fibrous silver particles, and an alkoxide compound.

2. The far infrared reflective film according to claim 1,
wherein the functional group capable of interacting with the fibrous silver particles is selected from the group consisting of an amide group, an amino group, a mercapto group, a phosphoric acid group, a phosphonic acid group, an isocyanate group, a carboxylic acid group, a sulfonic acid group, and a salt of these groups.

3. The far infrared reflective film according to claim 1,
wherein the functional group capable of interacting with the fibrous silver particles is selected from an amino group, a mercapto group, and an isocyanate group.

4. The far infrared reflective film according to claim 1,
wherein the metal coupling agent including the functional group capable of interacting with the fibrous silver particles satisfies a number of atom linking chains between the functional group capable of interacting with the fibrous silver particles and a central metal element of the metal coupling agent which is 3 to 6.

5. The far infrared reflective film according to claim 1,
wherein the metal coupling agent and the alkoxide compound are each independently a metal coupling agent and an alkoxide compound including an element selected from the group consisting of Si, Ti, Zr, and Al.

6. The far infrared reflective film according to claim 1, wherein the metal coupling agent and the alkoxide compound are respectively a metal coupling agent and an alkoxide compound including a Si element.

7. The far infrared reflective film according to claim 1, wherein a mass ratio of a content of the metal coupling agent including the functional group capable of interacting with the fibrous silver particles with respect to a content of the fibrous silver particles constituting the fibrous silver particles-containing layer is 0.0005/1 to 0.05/1.

8. The far infrared reflective film according to claim 1, wherein a content per unit area of the fibrous silver particles constituting the fibrous silver particles-containing layer is 0.036 to 0.150 g/m$^2$.

9. The far infrared reflective film according to claim 1, wherein an average long axis length of the fibrous silver particles is 5 to 30 μm.

10. The far infrared reflective film according to claim 1, further comprising:

an interlayer including a compound including a functional group capable of interacting with the fibrous silver particles, between the support and the fibrous silver particles-containing layer, wherein the interlayer including the compound including the functional group capable of interacting with the fibrous silver particles is directly in contact with the fibrous silver particles-containing layer.

11. The far infrared reflective film according to claim 1, wherein the fibrous silver particles-containing layer is disposed on an outermost layer on an indoor side.

12. A far infrared reflective glass obtained by laminating the far infrared reflective film according to claim 1 and a glass.

13. A window comprising:
a transparent window support; and
the far infrared reflective film according to claim 1 bonded to the transparent window support.

* * * * *